US012743095B2

(12) United States Patent
Raikar et al.

(10) Patent No.: US 12,743,095 B2
(45) Date of Patent: Sep. 22, 2026

(54) SYSTEMS, METHODS, AND PROGRAM PRODUCTS FOR ADJUSTING TRAVEL PATTERNS ON ROADWAYS USING SENSOR NODES

(71) Applicant: Torc Robotics, Inc., Blacksburg, VA (US)

(72) Inventors: Akshay Pai Raikar, Blacksburg, VA (US); Christopher Harrison, Blacksburg, VA (US); Michael Avitabile, Blacksburg, VA (US); Makarand Phatak, Blacksburg, VA (US); Joseph R. Fox-Rabinovitz, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 104 days.

(21) Appl. No.: 18/653,789

(22) Filed: May 2, 2024

(65) Prior Publication Data

US 2025/0341836 A1 Nov. 6, 2025

(51) Int. Cl.
*G05D 1/244* (2024.01)
*G05D 1/229* (2024.01)

(52) U.S. Cl.
CPC ........... *G05D 1/244* (2024.01); *G05D 1/2295* (2024.01)

(58) Field of Classification Search
None
See application file for complete search history.

(56) References Cited

U.S. PATENT DOCUMENTS 7,980,782 B2 7/2011 Bleiner et al.
10,803,737 B2 10/2020 Farajpour et al.
10,818,171 B2 10/2020 Agarwal et al.
10,991,242 B2 4/2021 Taylor
11,210,945 B2 12/2021 Kourous-Harrigan et al.
11,941,980 B1 * 3/2024 O'Sullivan ............ G08G 1/166
2011/0054731 A1 * 3/2011 DeRose ................. G06Q 10/08 701/31.4
2021/0065540 A1 3/2021 Galden
2022/0319311 A1 * 10/2022 Yousaf ................. G08G 1/0112
2023/0024393 A1 * 1/2023 Kiley .................... B61L 29/246
2023/0092432 A1 * 3/2023 Clifford ................. G08G 1/015 701/117
2023/0145429 A1 * 5/2023 Clifford ............... G08G 1/0133 340/937
2024/0132126 A1 * 4/2024 O'Sullivan .............. G08G 1/22

* cited by examiner

*Primary Examiner* — Davin Seol
(74) *Attorney, Agent, or Firm* — Armstrong Teasdale LLP

(57) ABSTRACT

Systems for adjusting travel patterns for autonomous vehicles are disclosed. The system includes a plurality of sensor nodes positioned on a roadway, where each sensor node is operably coupled to at least one distinct sensor node. The system also includes an autonomous vehicle (AV) computing device(s) in electronic communication with the plurality of sensor nodes. The AV computing device(s) adjusts travel patterns for an autonomous vehicle on the roadway by detecting a first sensor node of the plurality of sensor nodes and obtaining positional data for the first sensor node and each subsequent sensor node. The computing device(s) then generate a modified travel pattern for the autonomous vehicle based on positional data for each sensor node, and/or accessibility status for each sensor node. Additionally, the computing device adjusts an initial travel pattern of the autonomous vehicle on the roadway to the modified travel pattern.

17 Claims, 15 Drawing Sheets

SYSTEMS, METHODS, AND PROGRAM PRODUCTS FOR ADJUSTING TRAVEL PATTERNS ON ROADWAYS USING SENSOR NODES

TECHNICAL FIELD

The field of the disclosure relates generally to travel patterns for autonomous vehicles, and more particularly, to systems, program products, and methods for adjusting travel patterns for autonomous vehicles traveling on a roadway using a plurality of sensor nodes.

BACKGROUND OF THE INVENTION

Conventional traffic markers, such as construction barrels or cones, are typically used on roadways to notify drivers of restricted constructions zones or lane shifts. These conventional markers provide a visual indicator to drivers that their travel pattern on the road is likely to be altered ahead. For example, where a shoulder of a two-lane highway is undergoing construction, the right shoulder and right-most lane may be closed to drivers for the safety of the construction crew. As such, traffic markers are strategically positioned on the roadway, ahead of the construction zone to merge all traffic into the left-most lane.

While these conventional traffic markers are easily identifiable by drivers, who can take mental and physical steps to adjust their travel patterns, autonomous vehicles may struggle to adjust their travel patterns as easily. For example, sensors included within autonomous vehicles can detect or sense the traffic markers and determine that portions of the road ahead may not be accessible. However, this determination requires a heavy processing/computing load on the internal computing systems that assist the autonomous vehicle. For example, in order to make the determination that portions of the road ahead may not be accessible, based on the configuration of conventional traffic markers, the computing system of the autonomous vehicle must identify as many traffic markers it can, attempt to reconstruct the pattern or position of each of the conventional traffic markers, and then compare the traffic markers with a known map of the roadway to ultimately determine what portion of the road is accessible and inaccessible based on the traffic markers. These computations can be difficult, and often must be made very quickly—especially when construction zones are formed on highways.

It would be beneficial to have a system capable of adjusting travel patterns for the autonomous vehicle independent of complex comparisons of maps and conventional traffic markers, as well as avoiding complex computations for the computing system of the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed provides a system including: a plurality of sensor nodes positioned on a roadway, each sensor node positioned a predetermined distance from and operably coupled to at least one distinct sensor node of the plurality of sensor nodes; and at least one autonomous vehicle computing device in electronic communication with the plurality of sensor nodes, the at least one autonomous vehicle computing device configured to adjust travel patterns for an autonomous vehicle on the roadway by performing processes including: detecting a first sensor node of the plurality of sensor nodes; obtaining positional data for the first sensor node and each subsequent sensor node of the plurality of sensor nodes positioned at least one of adjacent to or downstream from the first sensor node; generating a modified travel pattern for the autonomous vehicle based on at least one of: the positional data for each sensor node of the plurality of sensor nodes on the roadway, or accessibility status for each sensor node of the plurality of sensor nodes on the roadway; and adjusting an initial travel pattern of the autonomous vehicle on the roadway to the modified travel pattern.

In another aspect, the disclosed provides a computer program product stored on a non-transitory computer-readable storage medium, which when executed by a computing system, adjusts travel patterns for an autonomous vehicle on a roadway, the computer program product including program code for: detecting a first sensor node of a plurality of sensor nodes, the plurality of sensor nodes positioned on the roadway; obtaining positional data for the first sensor node and each subsequent sensor node of the plurality of sensor nodes positioned at least one of adjacent to or downstream from the first sensor node; generating a modified travel pattern for the autonomous vehicle based on at least one of: the positional data for each sensor node of the plurality of sensor nodes on the roadway, or accessibility status for each sensor node of the plurality of sensor nodes on the roadway, the accessibility status including: an open status for the sensor node, or a restricted status for the sensor node; and adjusting an initial travel pattern of the autonomous vehicle on the roadway to the modified travel pattern.

In yet another aspect, the disclosed provides a method for adjusting travel patterns for an autonomous vehicle on a roadway, the method including: detecting a first sensor node of a plurality of sensor nodes, the plurality of sensor nodes positioned on the roadway; obtaining positional data for the first sensor node and each subsequent sensor node of the plurality of sensor nodes positioned at least one of adjacent to or downstream from the first sensor node; generating a modified travel pattern for the autonomous vehicle based on at least one of: the positional data for each sensor node of the plurality of sensor nodes on the roadway, or accessibility status for each sensor node of the plurality of sensor nodes on the roadway; and adjusting an initial travel pattern of the autonomous vehicle on the roadway to the modified travel pattern.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
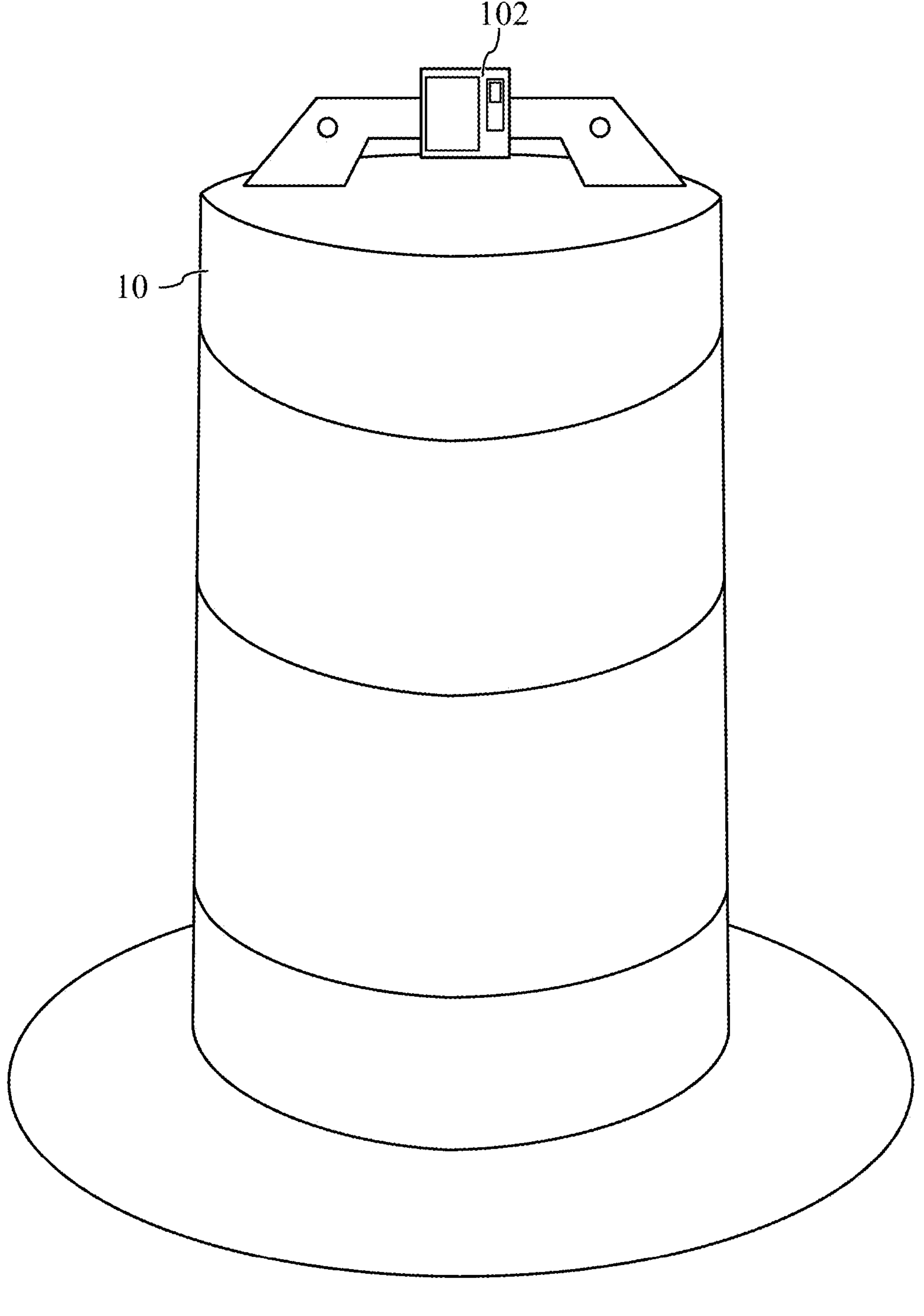
FIG. 1 shows a perspective view of a construction marker including a sensor node, according to an example.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims. As discussed herein, the disclosure relates generally to adjusting travel patterns for autonomous vehicles, and more particularly, to systems, program products, and methods for adjusting travel patterns for autonomous vehicles traveling on a roadway using a plurality of sensor nodes.

As discussed herein, the disclosure relates generally to travel patterns for autonomous vehicles, and more particularly, to systems, program products, and methods for adjusting travel patterns for autonomous vehicles traveling on a roadway using a plurality of sensor nodes.

These and other examples are discussed below with reference to FIGS. 1-10.

Figure 2A:
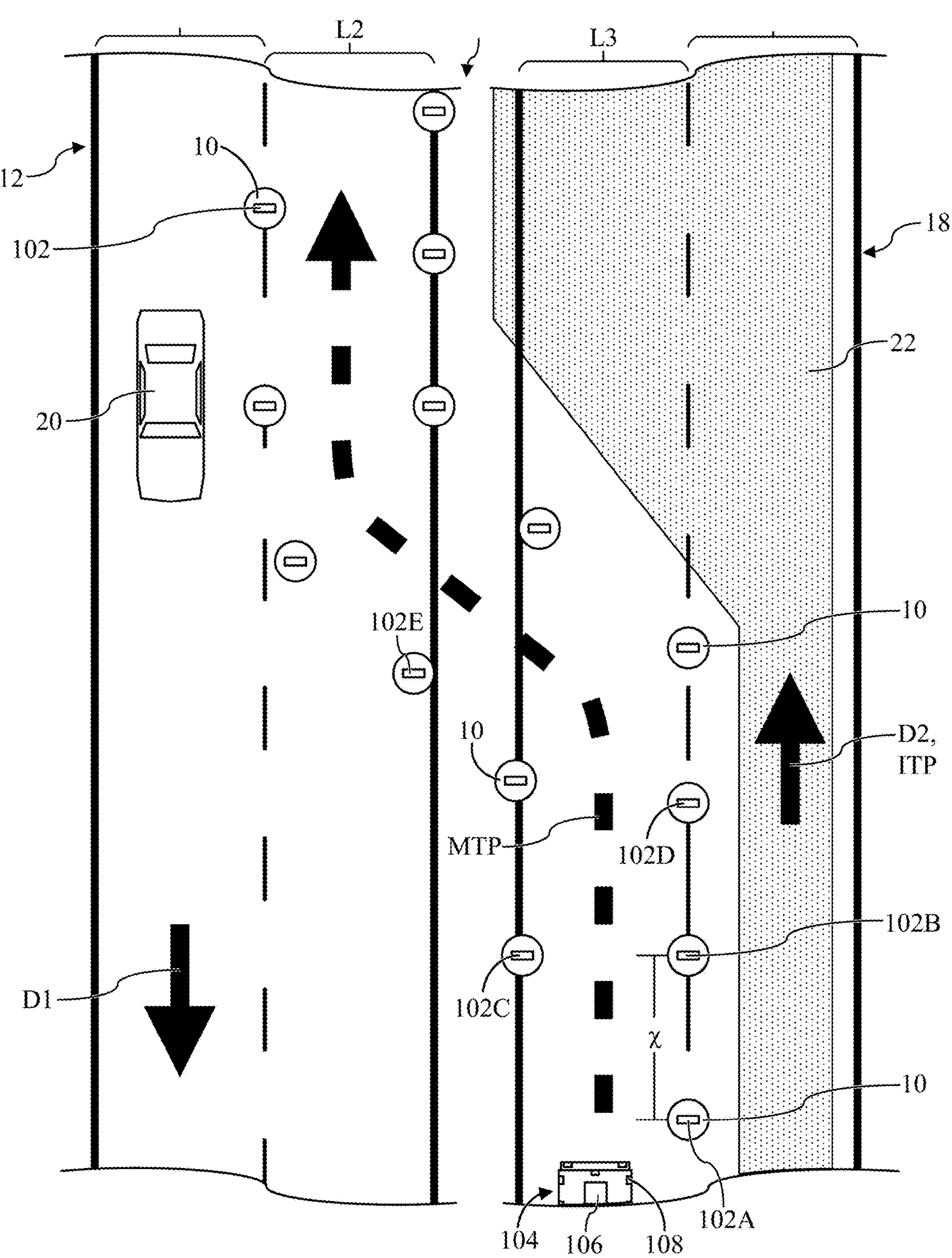
FIGS. 2A-2D show aerial views of an autonomous vehicle including a computing device and a plurality of the sensor nodes of FIG. 1 positioned on a roadway, according to examples.
Figure 2B:
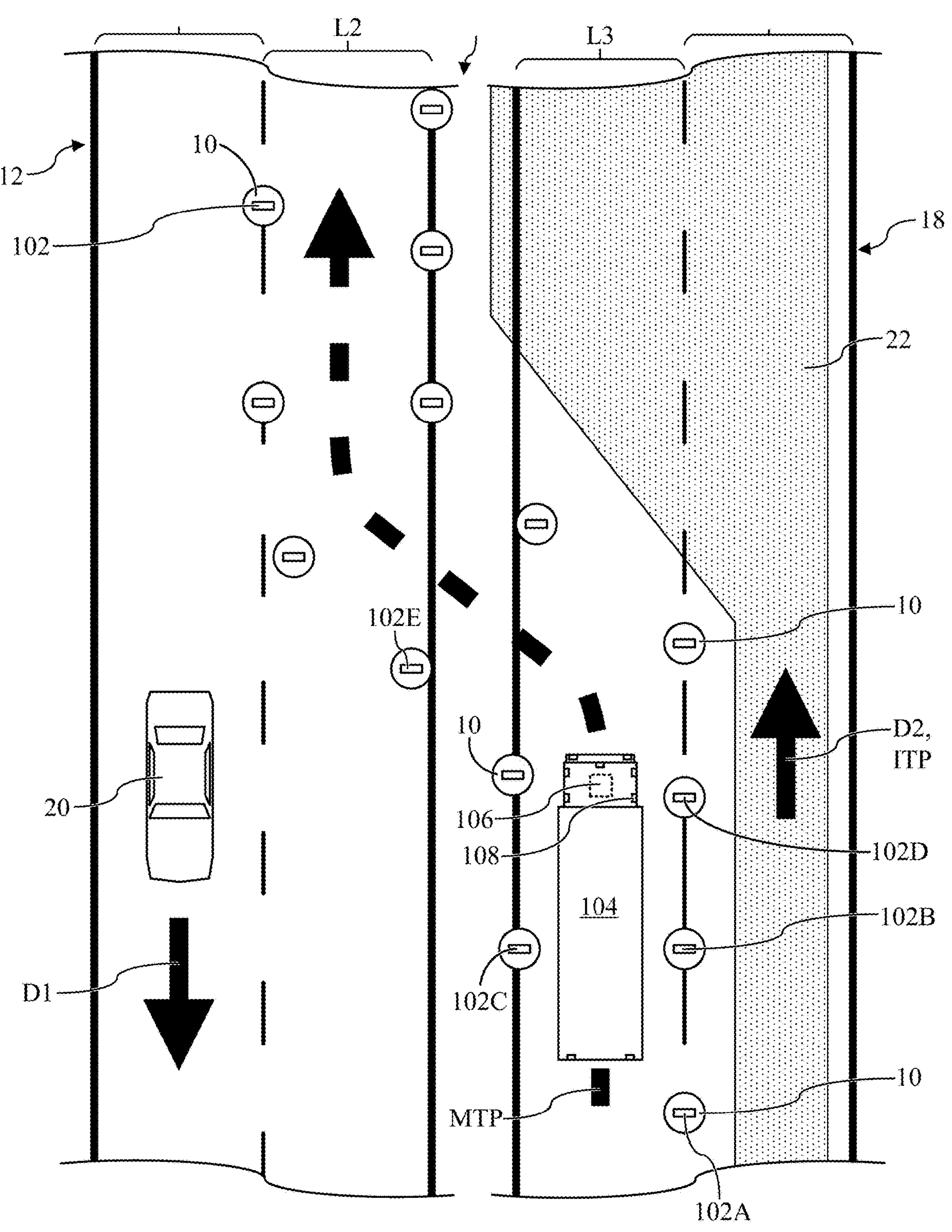
Figure 2C:
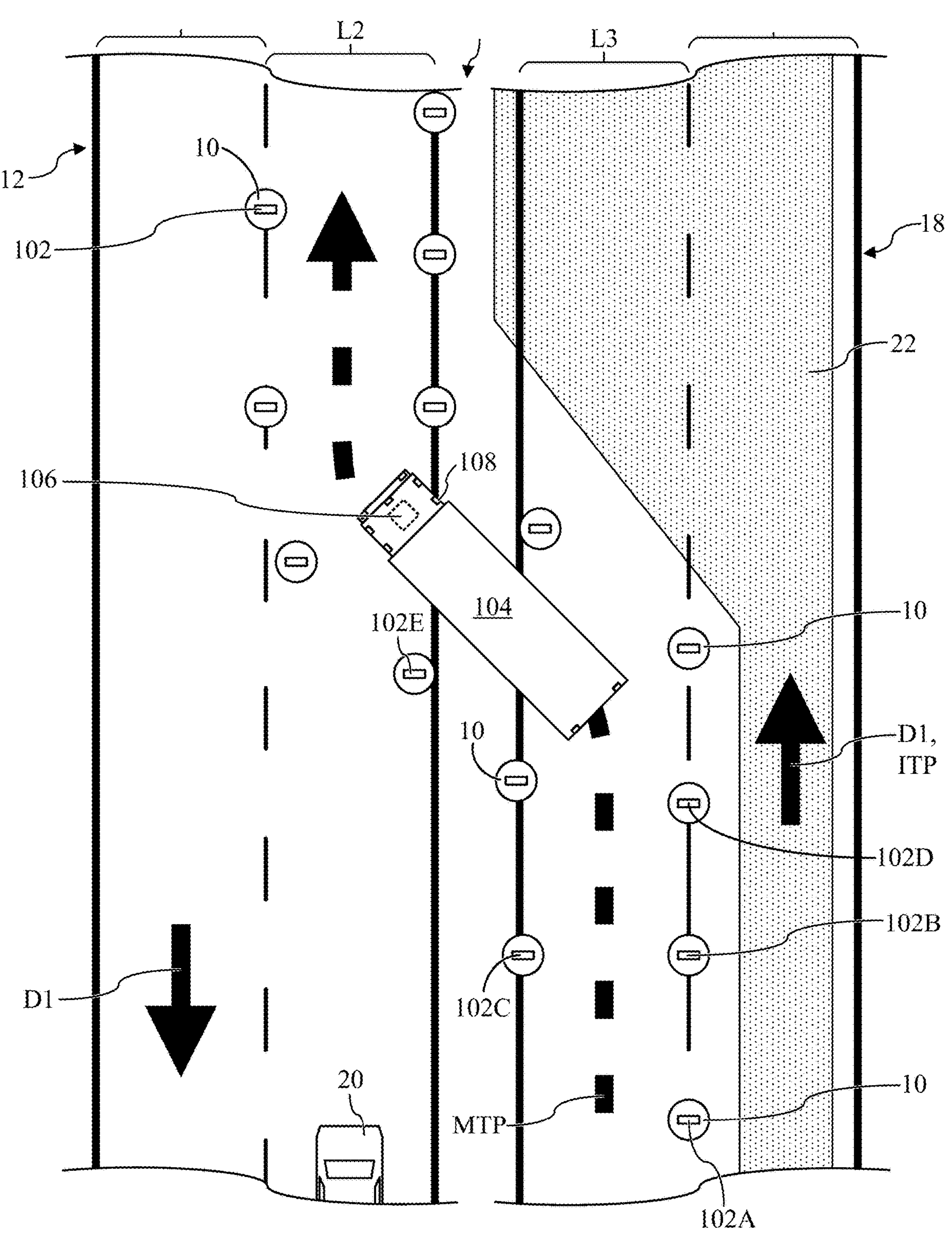
Figure 2D:
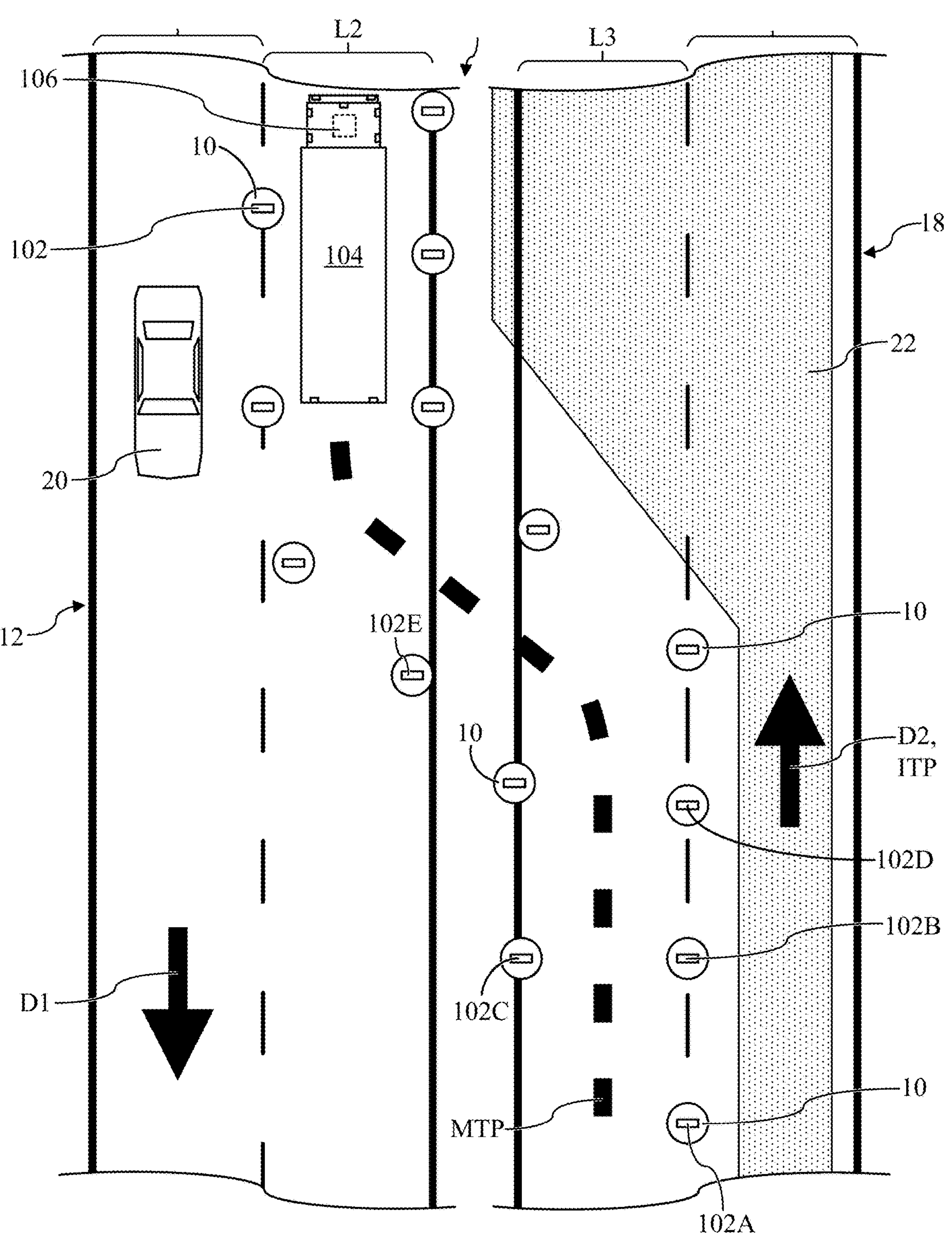

FIG. 1 shows a perspective view of a roadway construction marker 10 (hereafter, "marker 10") including a sensor node 102 of a system 100 for adjusting travel patterns for autonomous vehicles (see, FIG. 2A). Marker 10 is shown as a construction barrel or drum but can be formed as any suitable roadway marker used to define changes or restrictions on roadways. For example, marker 10 can be formed as a pylon/traffic cone, a traffic barrier, a traffic barricade, roadway signs, construction site vehicles, or any other suitable object positioned within a roadway construction zone or site.

Sensor node 102 is positioned on roadway construction marker 10. More specifically, sensor node 102 is positioned on, coupled to and/or formed integral with roadway construction marker 10. As discussed herein, a system including a plurality of markers 10 having at least one sensor node 102 positioned thereon, are used to adjacent travel patterns for autonomous vehicles. Although a single sensor node 102 is positioned on roadway construction marker 10, it is understood that a single marker 10 can include a plurality of sensor nodes 102 positioned thereon. In the example, sensor node 102 is positioned on or adjacent a top of roadway construction marker 10. However, sensor node 102 can be positioned on any portion of maker 10 so long as sensor node 102 can communicate and function as discussed herein.

Sensor node 102 generates positional data. More specifically, sensor node 102, positioned on roadway construction marker 10, is configured to generate, create, and/or establish positional data based on the position or location of marker 10 within a construction or restricted zone of a roadway (see, FIG. 2A). In a non-limiting example, sensor node 102 is configured to and/or includes internal components or devices that establish or determine a global position of sensor node 102/marker 10 (e.g., positional data) including, but not limited to, a global positioning system (GPS), or a global navigation satellite system (GNSS). The positional data is specific to each sensor node 102 and/or is dependent upon the position and/or location of the marker 10 including the sensor node 102. As discussed herein, positional data generated by sensor node 102 can also include movement anomalies (e.g., multiple positional changes within short period of time) of sensor node 102/marker 10 when sensor node 102 is activated and/or being utilized within a roadway construction zone (see, FIG. 4).

Additionally, sensor node 102 can store historical position data. More specifically, sensor node 102 is configured to and/or includes internal components or devices that store, collect, and/or create historical position data. The historical position data is based on previously determined positions (e.g., past positional data) of sensor node 102/roadway construction marker 10. Furthermore, sensor node 102 communicates with adjacent sensor node(s) 102 positioned on distinct markers 10 (see, FIG. 2A). That is, and as discussed herein, sensor node 102 is communicatively connected to and/or operably coupled to distinct sensor node(s) 102 positioned within a predetermined distance away. Each communicatively connected sensor node(s) 102 is configured to exchange or share data with one another. In an example, data shared between sensor nodes 102 can include, but are not limited to, sensor node information (e.g., node ID) for each sensor node 102 communicatively connected, positional data for each sensor node 102 communicatively connected, and historical positional data for each sensor node 102 communicatively connected. Sensor node 102 includes any suitable communication capability or protocol to allow information to be shared between at least two distinct sensor nodes 102. For example, sensor node 102 can include, but is not limited to, ZigBee protocols, Bluetooth® protocols, and the like. Additionally, and as discussed herein, sensor node 102 is configured to share, communication, and/or transfer the information or data included therein with distinct computing devices or computer systems of system 100 (e.g., computing device(s) of an autonomous vehicle).

FIGS. 2A-2D shows an aerial view of a portion of roads 12, 18, at least one driver vehicle 20 (hereafter, "vehicle 20") and an autonomous vehicle 104. In the example, roadway 12 includes a first lane (L1), and a second lane (L2) formed adjacent first lane (L1). Vehicle 20 is traveling first lane (L1) of roadway 12 in a direction (D1). Specifically, and during normal travel or travel patterns for roadway 12, all vehicles in first lane (L1) and second lane (L2) move along roadway 12 in direction (D1). However, and a discussed herein, road construction and/or blockages on roadway 18 can cause deviations from the normal travel or travel patterns for roadway 12 and/or roadway 18. In the non-limiting example shown in FIG. 2A, vehicle(s) 20 are passenger cars or vehicles that are piloted or controlled by a driver. In other non-limiting examples, vehicle(s) 20 can include any road-approved vehicle including motorcycles, box-trucks, tractor-trailers, and the like. Additionally, although discussed herein as being controlled by a driver, it is understood that vehicle(s) 20 can include an autonomous vehicle as well.

As shown in FIG. 2A, autonomous vehicle 104 is traveling in third lane (L3), adjacent fourth lane (L4) along roadway 18 in a direction (D2). Similar to roadway 12, during normal travel or travel patterns for roadway 18, all vehicles in third lane (L3) and fourth lane (L4) move along roadway 18 in direction (D2), opposite direction (D1) of roadway 12. As discussed herein, road construction and/or blockages on roadway 18 can cause deviations from the normal travel or travel patterns for roadway 18. In a non-limiting example, autonomous vehicle 104 is an autonomous or self-driving vehicle (e.g., autonomous cargo truck). In other non-limiting examples, autonomous vehicle 104 is a piloted vehicle that includes a driver controlling autonomous vehicle 104.

As shown in FIG. 2A, autonomous vehicle 104 includes at least one autonomous vehicle computing device 106 (hereafter, "computing device 106"). The at least one computing device 106 is electronically coupled and/or communicatively connected to various systems and/or components of autonomous vehicle 104. For example, computing device 106 is communicatively coupled to a system configured to control, monitor, and/or adjust the speed and acceleration of autonomous vehicle 104 (e.g., cruise control system, engine, fuel injector, and the like). Additionally in the example, computing device 106 is connected to a separate system, or alternatively includes a sub-system or computer program product, that functions or operates as an internal advanced driver assistance system (ADAS). As discussed herein, the ADAS communicating with, or included within, computing device 106 can monitor vehicles 20 and/or sensor nodes 102 of system 100 as autonomous vehicle 104 travels along roadway 18. In additional to an ADAS, a global positioning system (GPS) is communicatively coupled to, or alternatively included within, computing device 106. GPS system for autonomous vehicle 104 tracks the position of autonomous vehicle 104, provides desired routes based on the destination of autonomous vehicle 104, tracks/monitors traffic patterns for other vehicles on roads 12, 18, includes map data relating to roadway 12, 18, and monitors/obtains other suitable information relating to the routes of travel for autonomous vehicle 104. In the non-limiting example where autonomous vehicle 104 is an autonomous truck, the GPS system in communication with computing device 106 influences and/or determines operational parameters of autonomous vehicle 104 as autonomous vehicle 104 travels from a starting location to a final destination (e.g., an initial travel pattern (ITP)).

Computing device 106 of autonomous vehicle 104 can include additional suitable sub-systems and/or computer program products to monitor, determine, and/or receive data relating to operational parameters for autonomous vehicle 104. Operational parameters for autonomous vehicle 104 include, but are not limited to, a location of autonomous vehicle 104 with respect to roads 12, 18, a direction of travel for autonomous vehicle 104 on roadway 12, 18, future navigational information for autonomous vehicle 104, maps for roadways traveled on by autonomous vehicle 104, speed/acceleration of autonomous vehicle 104, and/or a size of autonomous vehicle 104. As discussed herein, computing device 106, along with operational parameters of autonomous vehicle 104 and data obtained from sensor nodes 102 of system 100, is configured to adjust travel patterns for autonomous vehicle 104 when necessary.

Autonomous vehicle 104 also includes at least one sensor 108 (hereafter, "AV sensor 108"). In the non-limiting example, autonomous vehicle 104 includes a plurality of AV sensors 108 positioned around and/or disposed on various portions of autonomous vehicle 104. As shown in the example in FIGS. 2A and 2B, AV sensors 108 are disposed on, positioned on, and/or coupled to an exterior of autonomous vehicle 104, adjacent to a front end of autonomous vehicle 104, and adjacent a back end of autonomous vehicle 104. The plurality of AV sensors 108 included on autonomous vehicle 104 are utilized in conjunction with the ADAS and/or computing device 106 of autonomous vehicle 104. That is, AV sensors 108 obtain, gather, and/or receive data regarding surrounding driver vehicles 20 and/or sensor nodes 102 positioned on roadways 12, 18 as autonomous vehicle 104 travels along roadway 12, 18. Data obtained by AV sensors 108 and/or computing device 106 is utilized in adjusting travel patterns for autonomous vehicle 104, and/or adjusts operational parameters of autonomous vehicle 104, as discussed herein. AV sensors 108 are configured as any suitable sensor that is capable of obtaining data that can be utilized by the ADAS and/or computing device 106 of autonomous vehicle 104. For example, AV sensors 108 are formed as long-range radio wave sensors, LIDAR (light detection and ranging) sensors, cameras, short/medium range radio wave sensors, ultrasonic sensors, and/any other suitable sensor capable of providing data as discussed herein.

As discussed herein, and as shown in FIG. 2A, system 100, configured to adjust travel patterns for autonomous vehicle 104, includes the plurality of sensor nodes 102 positioned on roadway 12, 18 and autonomous vehicle computing device 106 included with autonomous vehicle 104. In the non-limiting example, the plurality of sensor nodes 102 of system 100 are positioned on roadway 12, 18 in a predetermined configuration. Specifically, each marker 10 including one sensor node 102 of the plurality of sensor nodes is positioned, arranged, and/or setup on roadway 12, 18 in a predetermined and/or desired configuration based on a known obstruction or restricted area of roadway 12, 18. In the example shown in FIG. 2A, markers 10 including sensor nodes 102 are positioned adjacent to, define, and/or block off a predetermined construction zone 22 for roadway 12. Construction zone 22 spans over at least a portion of third lane (L3) and fourth lane (L4). As such, construction zone 22 renders both the third lane (L3) and fourth lane (L4) of roadway 18 restricted, closed, and/or inaccessible to vehicles 20 and autonomous vehicle 104. Additionally, each sensor node of the plurality of sensor nodes 102 are positioned a predetermined distance (χ) from at least one adjacent and distinct sensor node of the plurality of sensor nodes 102 in the predetermined/desired configuration. Positioning adjacent sensor nodes 102 within the predetermined distance (χ) allows each sensor node 102 to share, transmit, and/or communicate data (e.g., position data, historical position data) with adjacent sensor nodes 102, and ultimately define a modified travel pattern (MTP) for autonomous vehicle 104, as discussed herein. To allow vehicle 20/autonomous vehicles 104 to continue to travel in a direction (D2) along roadways 12, 18, marker 10 including sensor nodes 102 are also positioned on roadway 12, and more specifically, line or frame second lane (L2) of roadway 12, adjacent construction zone 22. Markers 10 provide vehicles 20 and their drivers/operators a clear visual of the "shift in lanes" and/or travel pattern for safely navigating around construction zone 22.

Autonomous vehicle 104 utilizes data provided by sensor nodes 102 positioned on markers 10 in the predetermined/desired configuration and spaced apart the predetermined distance (χ) from one another, to adjust a travel pattern and/or safely navigate around construction zone 22. In the non-limiting example shown in FIG. 2A, autonomous vehicle 104 includes an initial travel pattern (ITP) determined and/or established by computing device 106 and the various data or information (e.g., GPS, ADAS, etc.) obtained by AV sensors 108 of autonomous vehicle 104. Initial travel pattern (ITP) for autonomous vehicle 104 includes autonomous vehicle 104 traveling in direction (D2) within fourth lane (L4) of roadway 18, with the ability to change to third lane (L3) based on information determined by AV sensors 108 (e.g., ADAS data—vehicle 20 lane changes, GPS/map data—on/off ramps, etc.). However, because of construction zone 22, autonomous vehicle 104 must adjust its travel pattern from initial travel pattern (ITP) to a modified travel pattern (MTP). As shown in FIG. 2A, modified travel pattern (MTP) for autonomous vehicle 104 follows the markers 10/sensor nodes 102 positioned on markers 10 and defines a travel pattern extending between third lane (L3) of roadway 18 to second lane (L2) of roadway 12. As discussed herein, computing device 106 of autonomous vehicle 104 receives and processes data obtained from the plurality of sensor nodes 102 to adjust its travel pattern from initial travel pattern (ITP) to modified travel pattern (MTP).

The non-limiting example of FIGS. 2A-2D depicts autonomous vehicle 104 traveling the MTP in a direction (D2), around construction zone 22, while distinct vehicles 20 continue to safely travel along roadway 12, adjacent MTP/construction zone 22, in a direction (D1). As shown in FIG. 2A, autonomous vehicle 104 traveling on roadway 18 approaches a first, lead, and/or parent sensor node 102A (hereafter, "first sensor node 102A") positioned on roadway 18. In a non-limiting example, first sensor node 102A is predetermined as the first sensor node of the plurality of sensor nodes 102 of system 100 that autonomous vehicle 104, and more specifically computing device 106, will detect, encounter, pass, and/or communicate with. That is, once autonomous vehicle 104 is within a predetermined vicinity of first sensor node 102A, computing device 106 of autonomous vehicle 104 will initially detect first sensor node 102A and recognize that the initial travel pattern (ITP) may be adjusted or altered ahead. The predetermined vicinity of first sensor node 102A is based on, at least in part, the communication protocol (e.g., ZigBee protocol) utilized by the plurality of sensor nodes 102 of system 100.

Once first sensor node 102A is detected, computing device 106 of autonomous vehicle 104 begins to obtain data from the plurality of sensor nodes 102. More specifically, after detecting first sensor node 102A, first sensor node 102A and computing device 106 of autonomous vehicle 104 are communicatively connected such that computing device 106 begins to obtain data from first sensor node 102A. In a non-limiting example, computing device 106 obtains positional data specific to first sensor node 102A. Additionally, computing device 106 obtains data specific to other sensor nodes of the plurality of sensor nodes 102 positioned on roadway 18 within the predetermined distance (χ) of first sensor node 102A. For example, computing device 106 obtains positional data specific to sensor nodes 102B, 102C. In a non-limiting example, data specific to sensor nodes 102B, 102C is obtained by computing device 106 directly from first sensor node 102A, as sensor nodes 102B, 102C are within the predetermined distance (χ) from first sensor node 102A. That is, sensor nodes 102B, 102C positioned within the predetermined distance (χ) from first sensor node 102A communicate or share data with first sensor node 102A. First sensor node 102A in turn provides and/or allows computing device 106 of autonomous vehicle 104 to obtain data relating to sensor nodes 102B, 102C, in conjunction with obtained data specific to first sensor node 102A.

Additionally, data (e.g., positional data) specific to sensor node 102D is also obtained by computing device 106 of autonomous vehicle 104. In a non-limiting example, positional data specific to sensor node 102D is obtained from first sensor node 102A. Although outside the predetermined distance (χ) from first sensor node 102A, sensor node 102D is within the predetermined distance (χ) from sensor node 102B. As such, sensor node 102D shares data with sensor node 102B. Sensor node 102B can therefore share data specific to sensor node 102D, along with data specific to itself (e.g., sensor node 102B), with sensor node 102A. In this example where data is shared in series or in a cascading manner, data regarding all sensor nodes of the plurality of sensor nodes 102 are shared with first sensor node 102A. As such, as soon as first sensor node 102A is detected by computing device 106 of autonomous vehicle 104, all data specific to all of the plurality of sensor nodes 102 of system 100 can be obtained by computing device 106. In another non-limiting example, data specific to sensor node 102D can be obtained by computing device 106 from sensor node 102B directly. As similarly discussed herein with respect to first sensor node 102A, autonomous vehicle 104 shown in FIG. 2A can be within the predetermined vicinity of sensor node 102B as well. As a result, computing device 106 of autonomous vehicle 104 can obtain data (e.g., positional data) from both first sensor node 102A and sensor node 102B positioned adjacent to and downstream of first sensor node 102A. Additionally, as autonomous vehicle 104 traverses along roadways 12, 18 adjacent the plurality of sensor nodes 102, computing device 106 can continuously obtain data from each sensor node 102 as autonomous vehicle 104 travels within the predetermined vicinity of each respective sensor node 102.

Utilizing the obtained data for the plurality of sensor nodes 102, computing device 106 of autonomous vehicle 104 then generates a modified travel pattern (MTP). As discussed herein with respect to FIGS. 2A-2D, computing device 106 of autonomous vehicle 104 generates the modified travel pattern (MTP) based on the positional data for each of the plurality of sensor nodes 102 positioned on roadways 12, 18. In a non-limiting example, computing device 106 utilizes the positional data for each of the plurality of sensor nodes 102 to frame and/or define the outer boundaries of the modified travel pattern (MTP). That is, computing device generates the modified travel pattern (MTP) by defining outer boundaries for the modified travel pattern based on the positional data for each of the plurality of sensor nodes. In framing the outer boundaries of the modified travel pattern (MTP), computing device 106 determines that the modified travel path (MTP) in which autonomous vehicle 104 can use to safely traverse around construction zone 22 is between each of the plurality of sensor nodes 102 and/or the markers 10 including sensor nodes 102.

Additionally, or alternatively, when generating modified travel pattern (MTP) computing device 106 utilizes the positional data for each of the plurality of sensor nodes 102 to identify a restricted area of roadways 12, 18 in which autonomous vehicle 104 cannot travel within. In the non-limiting example, the column of sensor nodes 102, including sensor nodes 102A, 102B, 102D, originating between third lane (L3) and fourth lane (L4) of roadway 18 identify construction zone 22 as a restricted area of roadway 18. As such, computing device 106 of autonomous vehicle 104 can generate the modified travel pattern (MTP) to avoid restricted area/construction zone 22 (e.g., third lane (L3) and fourth lane (L4) of roadway 18). Additionally, the column of sensor nodes 102, including sensor node 102C, originating between second lane (L2) of roadway 12 and third lane (L3) of roadway 18 identify on-coming traffic lanes as a restricted area of roadway 12. Accordingly, computing device 106 of autonomous vehicle 104 can generate the modified travel pattern (MTP) to avoid restricted areas of roadway 12 (e.g., first lane (L1) of roadway 12, portions of second lane (L2) not including sensor nodes 102/markers 10).

Computing device 106 of autonomous vehicle 104 can utilize information obtained by sensors 108 and/or distinct systems (e.g., GPS) of computing device 106, in conjunction with data obtained by sensor nodes 102, to generate the modified travel pattern (MTP) for autonomous vehicle 104. For example, computing device 106 can utilize the GPS system including within and/or in communication with computing device 106 to aid in the generation of the modified travel pattern (MTP). In the example, computing device 106 can compare and/or correlate the obtained positional data for each of the plurality of sensor nodes 102 with a map defined within by GPS system to generate the modified travel pattern (MTP). In doing so, computing device 106 can check/confirm a generated modified travel pattern (MTP) is possible and/or determine when autonomous vehicle 104 can revert from the modified travel pattern (MTP) back to the initial travel pattern (ITP) (e.g., after passing construction zone 22).

As discussed herein, data can be obtained by computing device 106 of autonomous vehicle 104 all at once from first sensor node 102A. In this non-limiting example, the modified travel pattern (MTP) generated based on the obtained positional data of each of the plurality of sensor nodes 102 is generated, created, and/or established by computing device 106 of autonomous vehicle all at once. That is, the entirety of the modified travel pattern (MTP) is generated by computing device 106 after obtaining the positional data for each sensor node of the plurality of sensor nodes 102 from first sensor node 102A.

Alternatively, data can be obtained from each of the plurality of sensor nodes 102 individually, as autonomous vehicle 104 travels within the predetermined vicinity of the respective sensor node 102. In this example, the modified travel pattern (MTP) generated based on the obtained positional data of each of the plurality of sensor nodes 102 is generated, created, and/or established by computing device 106 of autonomous vehicle 104 in segments or in portions. Specifically, computing device 106 is continuously obtaining positional data for sensor nodes 102 within the predetermined vicinity of and ahead of traveling autonomous vehicle 104. As new positional data for sensor nodes 102 is obtained by computing device 106 computing device 106 generates, creates, and/or establishes a new portion or segment of the modified travel pattern (MTP) based on the newly obtained positional data. In an example, and with reference to FIG. 2A, where positional data is continuously obtained by computing device 106, the modified travel pattern (MTP) generated by computing device 106 does not include a portion or segment within second lane (L2) of roadway 12 when autonomous vehicle 104 is positioned adjacent first sensor node 102A. This is because computing device 106 has only obtained positional data for first sensor node 102A and subsequent senor nodes 102B, 102C, 102D, as discussed herein. In the example, computing device 106 can generate the modified travel pattern (MTP) to include the segment within second lane (L2) only after obtaining positional data for sensor nodes 102 positioned directly adjacent to second lane (L2) (e.g., sensor node 102E).

After the modified travel pattern (MTP) is generated by computing device 106, computing device 106 can adjust the initial travel pattern (ITP) of the autonomous vehicle to the generated, modified travel pattern (MTP). As discussed herein, the initial travel pattern (ITP) is based on, at least in part, GPS/map data, where the modified travel pattern (MTP) generated by computing device 106 is based on data obtained by the plurality of sensor nodes 102 of system 100. After computing device 106 generates the modified travel pattern (MTP) and adjusts from the initial travel pattern (ITP) to the modified travel pattern (MTP), computing device 106 traverses autonomous vehicle 104 on roadways 12, 18 along the modified travel pattern (MTP). As shown in the non-limiting example of FIGS. 2B-2D, computing device 106 traverses, controls, and/or causes autonomous vehicle 104 to travel along the modified travel pattern (MTP) adjacent and/or between the plurality of sensor nodes 102.

Once traversed past the plurality of sensor nodes 102, the modified travel pattern (MTP) ends, and computing device 106 can revert autonomous vehicle 104 back to the initial travel pattern (ITP). Continuing the example shown in FIGS. 2A-2D, construction zone 22 formed in roadway 18 can eventually end further down roadways 12, 18. In the example, predetermined configuration of markers 10/plurality of sensor nodes 102 can revert or redirect vehicles 20/autonomous vehicle 104 from second lane (L2) of roadway 12 back to third lane (L3)/fourth lane (L4) of roadway 18. Additionally, where construction zone 22 ends, and vehicles 20/autonomous vehicle 104 are redirected back onto roadway 18, no markers/sensor nodes 102 are positioned on roadway 18. As such computing device 106 of autonomous vehicle 104 ceases to obtain data from the plurality of sensor nodes 102. As a result of non-longer detecting sensor nodes 102 and/or obtaining data from sensor nodes 102 on roadways 12, 18, computing device 106 can adjust autonomous vehicle 104 from the modified travel pattern (MTP) back to the initial travel pattern (ITP).

Figure 3:
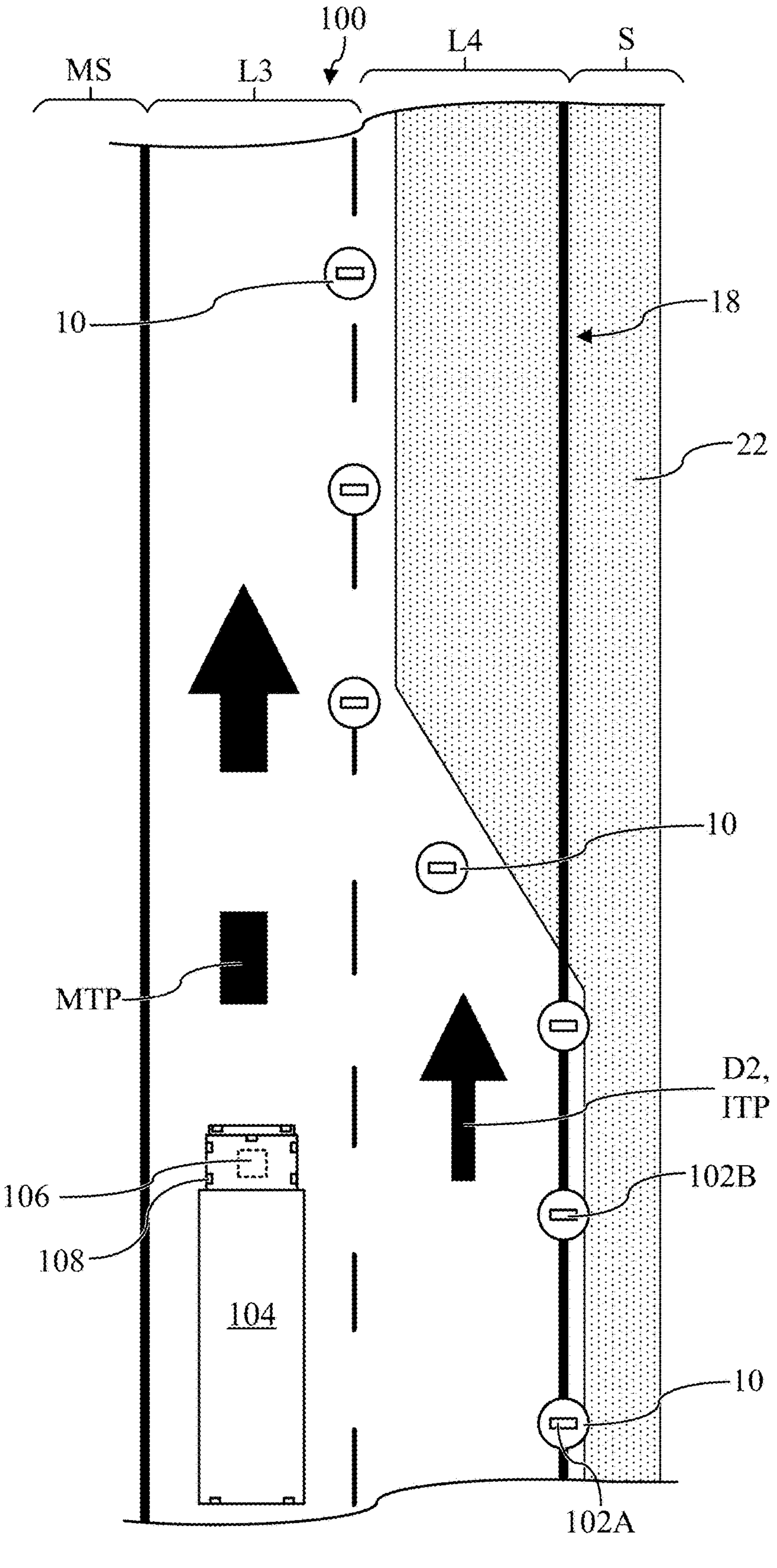
FIGS. 3 and 4 show aerial views of an autonomous vehicle including a computing device and a plurality of the sensor nodes positioned on a roadway, according to additional examples.

FIG. 3 shows an aerial view of a portion of roadway 18 and autonomous vehicle 104, according to additional examples. It is understood that similarly numbered and/or named components may function in a substantially similar fashion. Redundant explanation of these components has been omitted for clarity and/or brevity.

In the non-limiting example shown in FIG. 3, construction zone 22 can include a portion of fourth lane (L4) of roadway 18, as well as a shoulder(S) of roadway 18. Similar to the example shown and discussed herein with respect to FIGS. 2A-2D, a column of sensor nodes 102 positioned on markers 10 are positioned adjacent to construction zone 22 and define and/or identify a restricted area of roadway 18 for computing device 106 of autonomous vehicle 104. In the example shown in FIG. 3, the predetermined configuration of markers 10 only includes a single column of markers 10/sensor nodes 102 are used to identify the restricted area and/or provide positional data for computing device 106. As discussed herein the restricted area identified by the plurality of sensor nodes 102 positioned markers 10 included on roadway 18 define an area of roadway 18 in which autonomous vehicle 104 cannot travel on. Additionally, and distinct from examples discussed herein, the modified travel pattern (MTP) generated by computing device 106 is not framed or bounded by a plurality of markers 10 including sensor nodes 102. Rather, the positional data of sensor nodes 102 identifying the restricted area (e.g., construction zone 22), as well as GPS/map data specific to roadway 18, is used by computing device 106 to generate the modified travel pattern (MTP). In the example, computing device 106 generates the modified travel pattern (MTP) to traverse through third lane (L3) of roadway 18, adjacent to sensor nodes 102 and construction zone 22. The modified travel pattern (MTP) for autonomous vehicle 104 can be framed and/or bound by the median strip (MS), adjacent third lane (L3), as defined by the GPS system and/or map data provided to or obtained by computing device 106.

Figure 4:
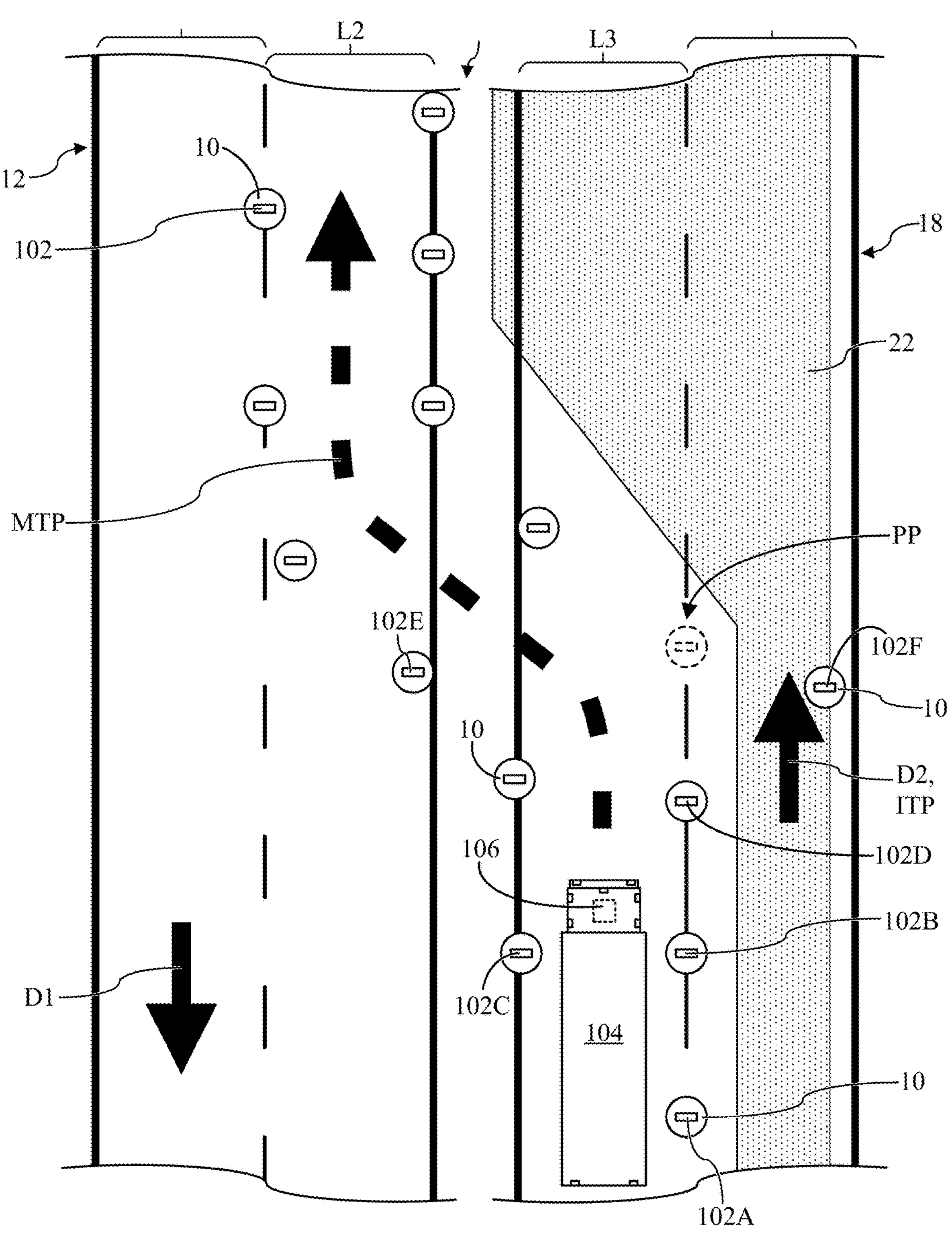

FIG. 4 shows another aerial view of a portion of roadways 12, 18 and autonomous vehicle 104, according to further examples. It is understood that similarly numbered and/or named components may function in a substantially similar fashion. Redundant explanation of these components has been omitted for clarity and/or brevity.

In the non-limiting example shown in FIG. 4, marker 10 including sensor node 102F is out of configuration. More specifically, marker 10 including sensor node 102F is not in the desired or predetermined position (PP) (shown in phantom) associated with the predetermined configuration of markers 10/the plurality of sensor nodes 102 for defining construction zone 22. Marker 10 including sensor node 102F can be out of configuration or away from the predetermined position (PP) for various reasons including, but not limited to, weather (e.g., wind), being unintentionally struck by vehicles 20 driving adjacent construction zone 22, or marker 10 including sensor node 102F can be a predesignated marker 10 that is moved to allow construction vehicles/construction personnel to enter/exit construction zone 22. In the example, sensor node 102F is further than the predetermined distance ($\chi$) from adjacent sensor nodes 102D, 102E. As a result, sensor node 102F cannot share information with sensor nodes 102D, 102E. Specifically, when away from predetermined position (PP), sensor node 102F cannot communicate with adjacent sensor nodes 102D, 102E, and therefore cannot share data with or obtain data about adjacent sensor nodes 102D, 102E. However, and as discussed herein, when sensor node 102F was previously situated within predetermined position (PP) (see, e.g., FIG. 2A) sensor node 102F would communicate data with adjacent sensor nodes 102D, 102E. This shared data for sensor node 102F includes positional data, as well as historical position data.

Although out of configuration and away from the predetermined position (PP), computing device 106 of autonomous 104 can still generate modified travel pattern (MTP) using data collected from the plurality of sensor nodes 102, including sensor node 102F. As discussed herein, the plurality of sensor nodes 102 share data including positional data, as well as historical position data. As such, although current positional data is not available for sensor node 102F because it is away from predetermined position (PP) and not capable of communicating with adjacent sensor nodes 102 (e.g., sensor node 102D), adjacent nodes 102 can provide computing device historical position data specific to and previously collected from sensor node 102F. In an example, historical position data specific to sensor node 102F can identify that sensor node 102F was in predetermined position (PP) for the previous three (3) hours prior to moving beyond the predetermined distance ($\chi$) and being incapable of communicating with adjacent sensor nodes 102. Additionally, or alternatively, the historical position data for sensor node 102F can also indicate that sensor node 102F was positioned in predetermined position (PP) for the previous two (2) days while construction zone 22 was restricted on roadway 18. In this example, computing device 106 of autonomous vehicle 104 can rely on historical position data for sensor node 102F, as well as positional data for the remaining sensor nodes 102 to generate the modified travel pattern (MTP) for autonomous vehicle 104, as similarly discussed herein.

In another non-limiting example where one or more sensor nodes of the plurality of sensor nodes 102 is not in the predetermined configuration, computing device 106 of autonomous vehicle 104 can compare data obtained from the plurality of sensor nodes 102 to aid in the generation of the modified travel pattern (MTP). That is, positional data for each sensor node of the plurality of sensor nodes 102 can be determined, detected, and/or identified, and subsequently provided to and/or obtained by computing device 106. Additionally, historical position data can also be obtained by computing device 106 from each sensor node of the plurality of sensor nodes 102. Once obtained, computing device 106 of autonomous vehicle 104 can compare the positional data for each sensor node 102 with the corresponding historical position data for each sensor node 102. Assuming in the example shown in FIG. 4 that sensor node 102F is still within the predetermined distance ($\chi$) of adjacent sensor nodes 102D, 102E and capable of sharing data, computing device 106 of autonomous vehicle 104 can obtain and compare positional data as well as historical data for sensor node 102F.

Computing device 106 can compare the positional data and the historical position data for each sensor node 102 to determine if the positional data (e.g., current position of sensor node 102) for each sensor node 102 deviates beyond a sensor node threshold from the historical position data. The sensor node threshold can include, but is not limited to, a predefined maximum distance of deviation between the positional data and historical position data, a predefined number of times positional data differs from historical position data (e.g., moving marker 10 back-and-forth), and/or a predefined duration of time in which positional data differs from historical position data. Where the positional data for each sensor node of the plurality of sensor nodes 102 does not (or minimally) deviates from the historical position data for each sensor node, computing device 106 of autonomous vehicle 104 can generate/maintain the modified travel pattern (MTP) based on the positional data and/or historical position data, as discussed herein.

Returning to FIG. 4, sensor node 102F is shown as being out of configuration and/or positioned away from predetermined position (PP). However, sensor node 102F is still in communication and capable of sharing positional data and historical position data with adjacent sensor nodes (e.g., sensor node 102D). In a non-limiting example, the sensor node threshold can include the predefined maximum distance of deviation between the positional data and historical position data for sensor node 102F. In the example shown in FIG. 4, computing device 106 can determine that the positional data for sensor node 102F (e.g., current location) does not exceed or deviate from the sensor node threshold (e.g., predefined maximum distance of deviation) when compared to historical position data for sensor node 102F. This determination can confirm that sensor node 102F should be located in predetermined position (PP), and computing device 106 of autonomous vehicle 104 can utilize historical data for sensor node 102F when generating the modified travel pattern (MTP), and positional data for distinct sensor nodes 102.

Although discussed herein as being a single sensor node threshold, it is understood that computing device 106 of autonomous vehicle 104 can include one or more of the examples for sensor node threshold provided, when determining whether to maintain the modified travel pattern (MTP) or generating a distinct modified travel pattern (DMTP). Furthermore, although only discussed herein as comparing positional data and historical position data for a single sensor node (e.g., sensor node 102F), it is understood that positional data and historical position data for each sensor node of the plurality of sensor nodes 102 can be compared, as discussed herein.

Figure 5:
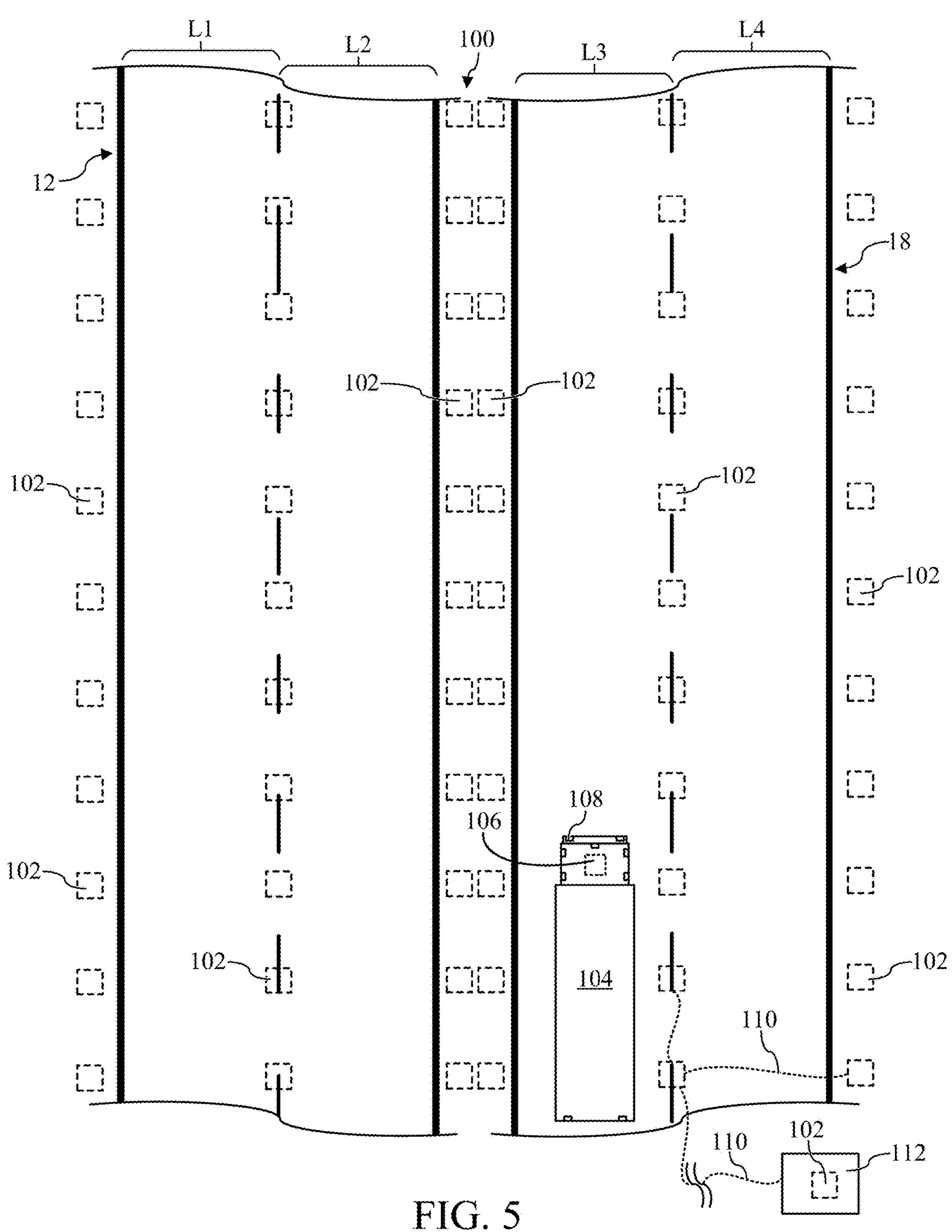
FIG. 5-7 show aerial views of an autonomous vehicle including a computing device, a plurality of the sensor nodes embedded directly in a roadway, and a central computing device, according to further examples.
Figure 6:
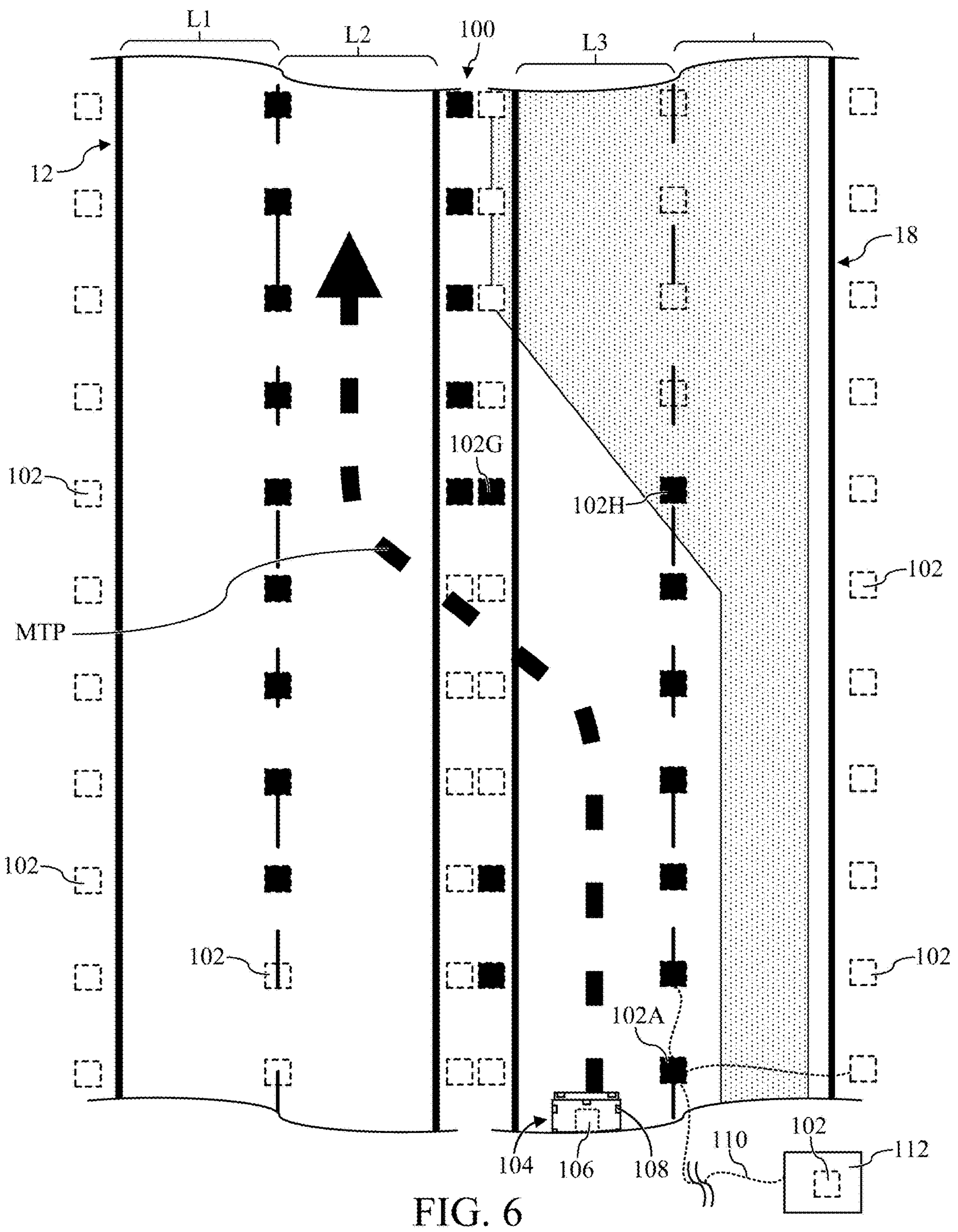

FIGS. 5 and 6 show aerial views of a portion of roadways 12, 18 and autonomous vehicle 104, according to another example. It is understood that similarly numbered and/or named components may function in a substantially similar fashion. Redundant explanation of these components has been omitted for clarity and/or brevity.

Distinct from the examples shown and discussed herein with respect to FIGS. 1-4, system 100 shown in FIGS. 5 and 6 includes a plurality of sensor nodes 102 positioned directly on roadways 12, 18. More specifically, and as shown in FIGS. 5 and 6, each of the plurality of sensor nodes 102 (shown in phantom) of system 100 are positioned directly on, directly in, and/or permanently embedded within roadways 12, 18. Distinct from sensor nodes positioned on markers 10, sensor nodes 102 shown in FIGS. 5 and 6 have a fixed positioned within roadways 12, 18. In a non-limiting example shown, the plurality of sensor nodes 102 form a grid on roadways 12, 18 where sensor nodes are substantially aligned and positioned equidistant from one another. Specifically, roadway 12 includes a column of sensor nodes 102 positioned adjacent first lane (L1), a column of sensor nodes 102 positioned between first lane (L1) and second lane (L2), and a column of sensor nodes 102 positioned adjacent second lane (L2). Additionally, roadway 18 includes a column of sensor nodes 102 positioned adjacent third lane (L3), a column of sensor nodes 102 positioned between third lane (L3) and fourth lane (L4), and a column of sensor nodes 102 positioned adjacent fourth lane (L4).

As similarly discussed herein, each of the plurality of sensor nodes 102 positioned directly on and/or permanently affixed to roadways 12, 18 can communicate and share data with adjacent sensor nodes 102. In an example, the plurality of sensor nodes 102 can be configured to share data using any suitable communication protocol (e.g., ZigBee protocol), as similarly discussed herein. In another non-limiting example, each sensor node of the plurality of sensor nodes 102 can be electronically/operably coupled and/or hardwired 110 to adjacent sensor nodes 102 (e.g., sensor nodes 102A, 102B, 102C), or to each distinct sensor nodes 102 in order to communicate and/or share data. In further non-limiting examples, none of the plurality of sensor nodes 102 can communication with each other, but rather can communicate and/or share data with a distinct device or system (e.g., central computing device). In any example, and as similarly discussed herein, each of the plurality of sensor nodes 102 also can communicate with computing device 106 of autonomous vehicle 104, and are utilized to adjust travel patterns for autonomous vehicle 104 traveling along roadways 12, 18.

System 100 can also include at least one central computing device 112 (hereafter, "central computing device 112"). Central computing device 112 is electronically/operably coupled and/or communicatively connected to each of the plurality of sensor nodes 102. In a non-limiting example, central computing device 112 is operably coupled to and/or communicatively connected to each of the plurality of sensor nodes 102 using any suitable includes any suitable communication protocol to allow data to be shared between sensor nodes 102 and central computing device 112, and/or to allow central computing device 112 to adjust an accessibility status of sensor nodes 102, as discussed herein. For example, computing device 112 can communication with each of the plurality of sensor nodes 102 via a satellite or space communication protocol. In another non-limiting example, central computing device 112 can be electrically coupled and/or hardwired 110 to each of the plurality of sensor nodes 102 (e.g., sensor node 102A). As shown in FIGS. 5 and 6, central computing device 112 is a distinct component than computing device 106 of autonomous vehicle 104.

Similar to computing device 106 discussed herein, central computing device 112 can obtain, detect, and/or receive data relating to each of the plurality of sensor nodes 102 positioned within roadways 12, 18. For example, central computing device 112 can obtain or receive data relating to sensor node information (e.g., node ID) for each sensor node 102, and/or positional data for each sensor node 102. Because sensor nodes 102 are embedded within roadways 12, 18, the positional data remains constant and/or synonymous to the node ID for each of the plurality of sensor nodes 102.

Central computing device 112 can also obtain, detect, and/or determine data relating the accessibility status for each sensor node of the plurality of sensor nodes embedded within roadways 12, 18. Additionally, central computing device 112 in communication with each sensor node 102 is configured to operably adjust the accessibility status of each sensor node 102. In a non-limiting example, accessibility status for each sensor node 102 can include an open status or a restricted or closed status. Sensor nodes 102 including and/or operably adjusted to an open accessibility status indicate to computing device 106 of autonomous vehicle 104 that areas of roadway 12, 18 are accessible and/or clear to travel on. In another non-limiting example, when a sensor node 102 includes and/or is adjusted to an open accessibility status, sensor node 102 can be "deactivated" or undetectable by computing device 106. In this example, where sensor nodes 102 are undetected, computing device 106 can maintain the initial travel pattern (ITP) for autonomous vehicle 104 and/or does not generate a modified travel pattern (MTP). Sensor nodes 102 including and/or operably adjusted to a restricted accessibility status can define, identify, and/or frame restricted areas (e.g., construction zone 22) of roadways 12, 18, which in turn aid computing device 106 in generating modified travel patterns (MTP), as similarly discussed herein. Additionally as discussed herein, because central computing device 112 is configured to selectively and operably adjusting the accessibility status for each sensor node 102 of system 100, central computing device 112 aids computing device 106 of autonomous vehicle 104 in generating a modified travel pattern (MTP) to avoid an obstruction or restricted area of roadway 12, 18.

Turning to FIG. 6, a non-limiting example of roadways 12, 18 including embedded sensor nodes 102 are shown. As similarly discussed herein with respect to FIGS. 2A-2D, predetermined construction zone 22 includes a portion of roadway 18 that is obstructed and/or restricted from vehicle travel. In the example shown in FIG. 6, a plurality of sensor nodes 102 positioned within roadways 12, 18 are in different accessibility states. For example, sensor nodes 102 depicted in phantom include an open accessibility status, while solid sensor nodes 102 (e.g., blacked-out) include a restricted status. The accessibility status of each of the plurality of sensor nodes 102 positioned and/or embedded within roadways 12, 18 are predetermined and operably adjusted using central computing device 112. For example, authorized users or personnel (e.g., Department of Transportation employee) can access central computing device 112 and operably adjust the accessibility status for each of the plurality of sensor nodes 102 embedded within roadway 12, 18. In the example, the authorized user can adjust accessibility statuses for a predetermined set sensor nodes 102 to define and/or block off construction zone 22 from autonomous vehicle 104. That is, after determining the physical location (e.g., mile markers) of construction zone 22 on roadways 12, 18, the authorized user can utilize central computing device 112 to determine which sensor nodes 102 are positioned within the physical location and adjust the accessibility status of sensor nodes 102 positioned adjacent to construction zone 22 from an open status to a restricted status.

In the non-limiting example shown in FIG. 6, sensor nodes 102 positioned adjacent to construction zone 22 include the restricted status to define, and/or block off construction zone 22 for roadway 12. Additional in the example, and understanding that autonomous vehicle 104 needs to move to second lane (L2) of roadway 12 to traverse around construction zone 22, authorized user/central computing device 112 adjusts sensor nodes positioned between first lane (L1) and second lane (L2) of roadway 12 to define another boundary or restricted area (e.g., on-coming traffic) for computing device 106 of autonomous vehicle 104.

Utilizing the obtained data (e.g., accessibility status) for the plurality of sensor nodes 102, computing device 106 of autonomous vehicle 104 then generates the modified travel pattern (MTP). In the example, computing device 106 of autonomous vehicle 104 generates the modified travel pattern (MTP) based on the accessibility status for each of the plurality of sensor nodes 102 positioned on roadways 12, 18, as operably adjusted using central computing device 112. As similarly discussed herein with respect to FIGS. 2A-2D, computing device 106 generates the modified travel pattern (MTP) by defining outer boundaries for the modified travel pattern (MTP) based on the determined/detected accessibility status for each of the plurality of sensor nodes 102. In framing the outer boundaries of the modified travel pattern (MTP), computing device 106 determines that the modified travel path (MTP) in which autonomous vehicle 104 can use to safely traverse around construction zone 22 is between each of the plurality of sensor nodes 102 having a restricted status.

Additionally, or alternatively, when generating modified travel pattern (MTP) computing device 106 utilizes the accessibility status for each of the plurality of sensor nodes 102 to identify a restricted area of roadways 12, 18 in which autonomous vehicle 104 cannot travel within. In the non-limiting example, two adjacent sensor nodes 102 (e.g., sensor nodes 102G, 102H) identify a boundary of construction zone 22 as a restricted area of roadway 18, and area of roadway 18 in which autonomous vehicle 104 should not cross through. As such, computing device 106 of autonomous vehicle 104 can generate the modified travel pattern (MTP) to avoid restricted area/construction zone 22 (e.g., traversing between sensor nodes 102G, 102H).

As similarly discussed herein, computing device 106 of autonomous vehicle 104 can also utilize information obtained by sensors 108 and/or distinct systems (e.g., GPS) of computing device 106, in conjunction with obtained or detected accessibility status for each sensor node 102, to generate the modified travel pattern (MTP) for autonomous vehicle 104. Additionally, and similar to the non-limiting examples discussed herein with respect to FIGS. 2A-2D, the accessibility status of sensor nodes 102 can be obtained by computing device of autonomous vehicle all at once from first sensor node 102A including the restricted status, or alternatively can be obtained as autonomous vehicle travels within the predetermined vicinity of respective senor nodes 102. In another example, computing device 106 of autonomous vehicle 104 can also be in electronic communication and/or operably coupled to central computing device 112. In this example, central computing device 112 can communicate and/or share the accessibility status of sensor nodes 102 with computing device 106 directly. Once the modified travel pattern (MTP) is generated by computing device 106, computing device 106 can adjust the initial travel pattern (ITP) of the autonomous vehicle to the generated, modified travel pattern (MTP), as similarly discussed herein.

Figure 7:
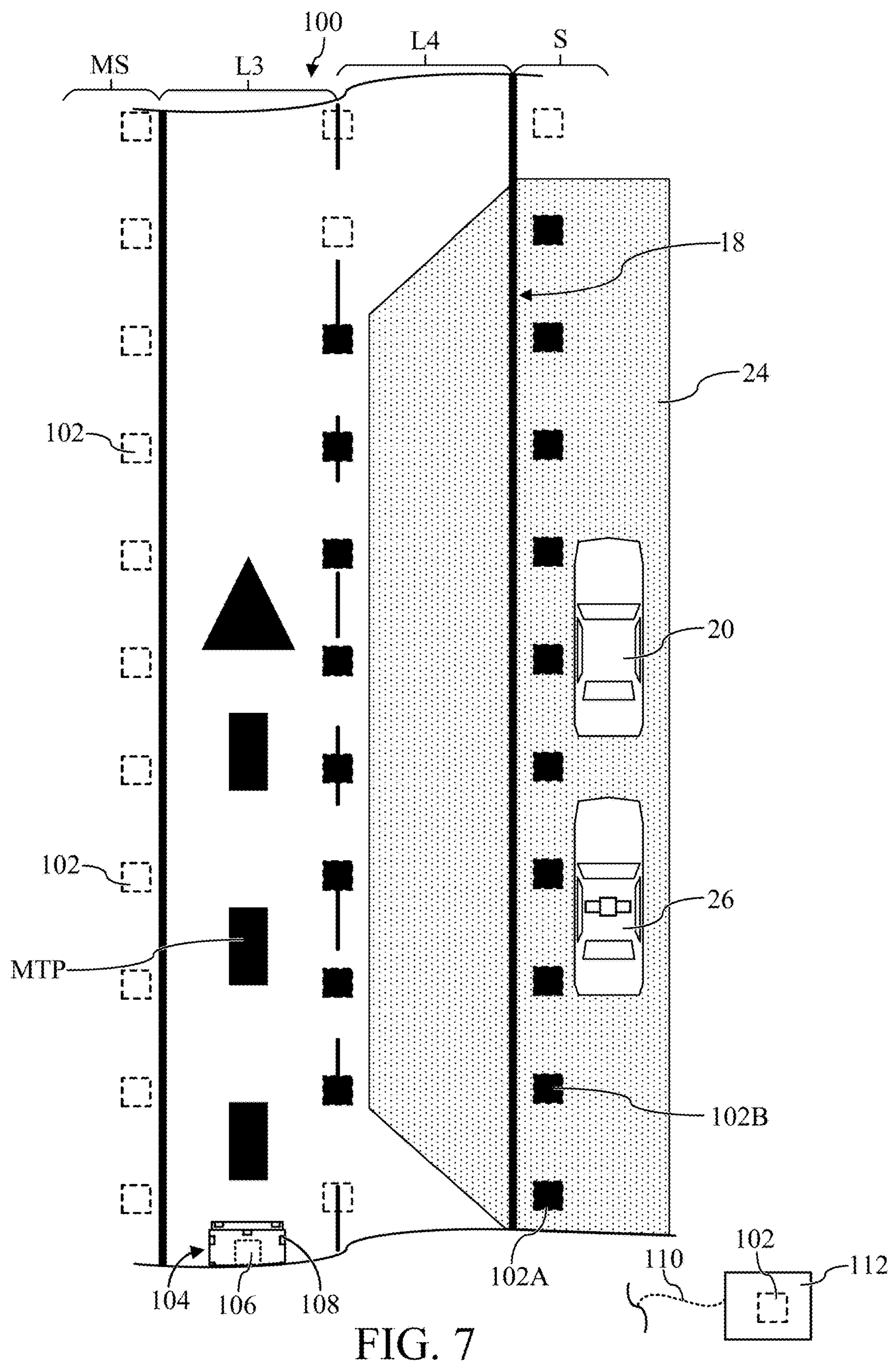

FIG. 7 shows another non-limiting example of system 100 including the plurality of sensor nodes 102, computing device 106 of autonomous vehicle 104, and central computing device 112. It is understood that similarly numbered and/or named components can function in a substantially similar fashion. Redundant explanation of these components has been omitted for clarity.

As shown in FIG. 7, restricted zone 24 can include a restricted or obstructed area of roadway 18 that includes a first responder 26 (e.g., police officer) and vehicle 20. In the example, first responder 26 is positioned beyond vehicle 20 in the shoulder(S) of roadway 18. In some states, it is required of drivers and vehicles to move out of the closest lane (e.g., fourth lane (L4)) to a first responder 26 parked in the shoulder(S). As such, the plurality of sensor nodes 102 positioned within the shoulder(S) behind, adjacent to, and in front of first responder 26 include a restricted accessibility status. Additionally, a plurality of sensor nodes 102 positioned between third lane (L3) and fourth lane (L4), and adjacent to first responder 26 and vehicle 20 also include the restricted accessibility status. As discussed herein, the restricted accessibility statuses for the selected sensor nodes 102 of roadway 18 define the restricted zone 24 for computing device 106 of autonomous vehicle 104. As such, computing device 106 can generate the modified travel pattern (MTP) for autonomous vehicle 104 to avoid restricted zone 24 surrounding first responder 26. As a result, the modified travel pattern (MTP) generated by computing device 106 includes traversing autonomous vehicle 104 on third lane (L3) of roadway 18, adjacent restricted zone 24.

As discussed herein, central computing device 112 adjusts the accessibility status for each of the plurality of sensor nodes 102. In the example shown in FIG. 7, first responder 26 is an authorized user of central computing device 112 and can instruct central computing device 112 to operably adjust the accessibility statuses of the plurality of sensor nodes 102 surrounding their vehicle when stopped in shoulder(S) of roadway 18. Additionally, and through use of a GPS system included within first responder's vehicle 26, central computing device 112 can locate first responder 26 on roadway 18, determine which sensor nodes 102 are adjacent to first responder 26, and prompt first responder 26 to confirm operably adjusting the accessibility status of sensor nodes 102 surrounding first responder 26, as discussed herein.

Figure 8A:
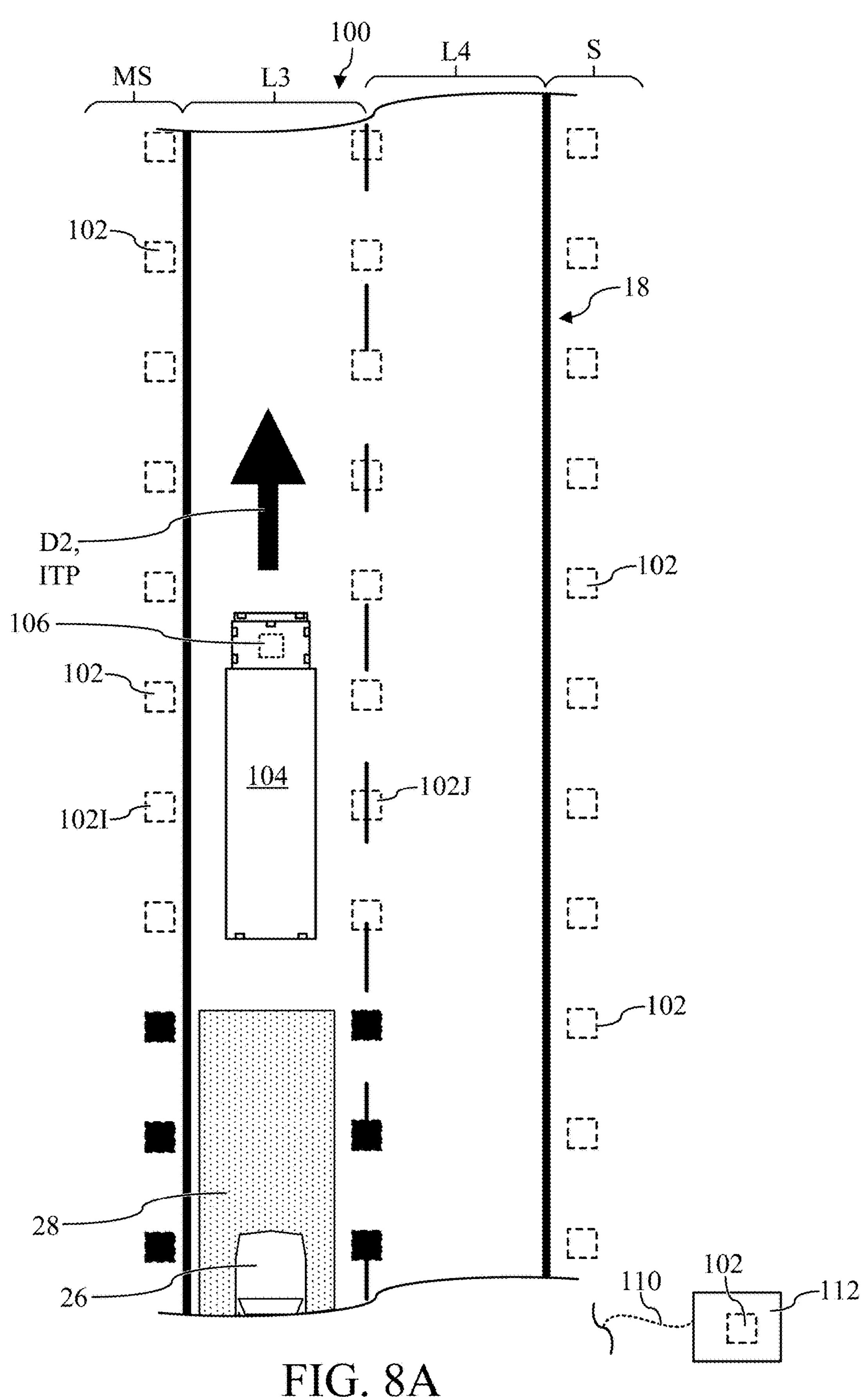
FIGS. 8A-8C show aerial views of an autonomous vehicle including a computing device, a plurality of the sensor nodes embedded directly in a roadway, a central computing device, and a first responder vehicle traversing along the roadway, according to an example.
Figure 8B:
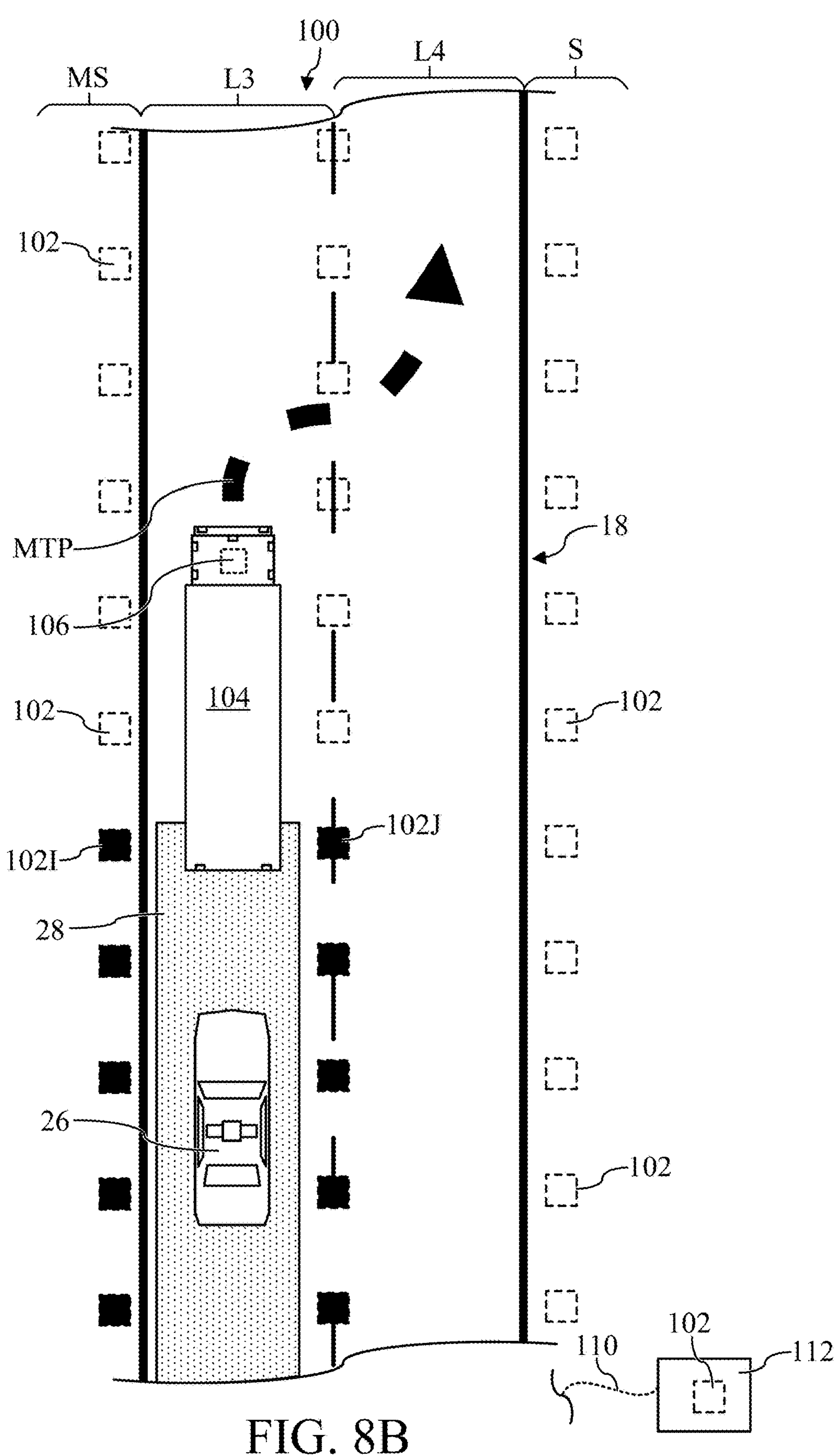
Figure 8C:
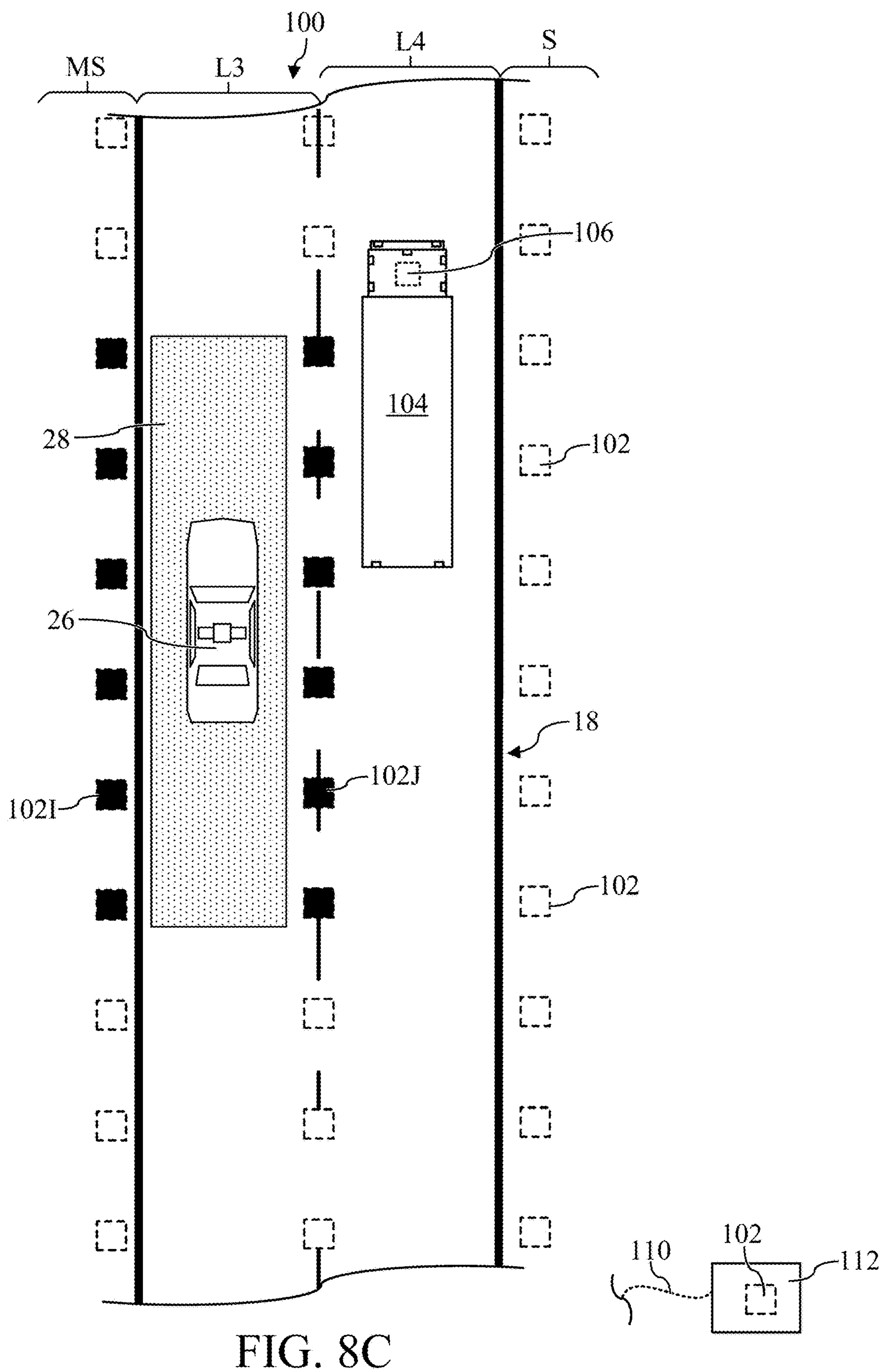

Sensor nodes 102 can be used to dynamically define a moving, restricted area of roadways 12, 18. Turning to FIGS. 8A-8C, a non-limiting example of dynamically defining a moving, restricted area on roadway 18 is shown. Specifically, FIG. 8A shows first responder 26 traveling in a direction (D2) within the third lane (L3) of roadway 18, and autonomous vehicle 104 also traveling in a direction (D2) within third lane (L3). Additionally, autonomous vehicle 104 is traveling in its initial travel pattern (ITP), as defined by computing device 106. In the example, first responder 26 is responding to an emergency, and can have its lights activated notifying surrounding drivers they should move over and allow first responder 26 to pass. However, autonomous vehicle 104 may not include a driver or operator.

In the non-limiting example, first responder 26 can utilize the plurality of sensor nodes 102 and central computing device 112 to notify autonomous vehicles 104 (and computing device 106) that first responder 26 needs to pass and/or autonomous vehicle 104 should alter its travel pattern. As shown in FIGS. 8A-8C, sensor nodes 102 embedded within roadway 18, and adjacent moving first responder 26 can include a restricted accessibility status. More specifically, and when first responder 26 is traveling in third lane (L3), a predetermined number of sensor nodes 102 of the plurality of sensor nodes 102 embedded within median strip (MS) of roadway 18 include the restricted accessibility status, and a predetermined number of sensor nodes 102 embedded within roadway 18 between third lane (L3) and fourth lane (L4) include the restricted accessibility status. In the example shown in FIG. 8B, six sensor nodes 102 (e.g., two in front, two adjacent, two behind) in both median strip (MS) of roadway 18 and between third lane (L3) and fourth lane (L4) surrounding first responder 26 include the restricted accessibility status. However, any number of sensor nodes 102 can surround first responder 26 and be dynamically changed as first responder 26 travels on roadway 18.

The area surrounding first responder 26 and defined by each sensor node 102 including the restricted accessibility status, is a dynamic or moving restricted zone 28. That is, as first responder 26 travels in direction (D2) along roadway 18, sensor nodes 102 ahead of first responder 26 change from an open accessibility status to the restricted accessibility status, while sensor nodes 102 behind first responder 26 change from the restricted accessibility status to the open accessibility status. As such, moving restricted zone 28 is continuously defined on roadway 18, via sensor nodes 102, as first responder travels in along roadway 18. Through a GPS system within first responder 26, central computing device 112 can instruct, alter, and/or operably adjust the accessibility status for each sensor node 102 corresponding to and/or defining moving restricted zone 28.

As a result of restricted zone 28 dynamically changing and/or moving with first responder 26, computing device 106 of autonomous vehicle 104 must continuously detect sensor nodes 102 in order to determine if the travel pattern for autonomous vehicle 104 must be adjusted. For example, and with reference to FIG. 8A, autonomous vehicle 104 is position in third lane (L3), in front of first responder 26, and traveling in a direction (D2)/traversing roadway 18 in the initial travel pattern (ITP). While traveling in the initial travel pattern (ITP), computing device 106 continuously detects the accessibility status for each sensor node of the plurality of sensor nodes 102 adjacent to autonomous vehicle 104. In the example shown in FIG. 8A, all sensor nodes 102 detected by computing device 106 of autonomous vehicle include an open accessibility status.

However, as first responder 26 gets closer to autonomous vehicle 104, the accessibility status of adjacent sensor nodes 102 can change. Turning to FIG. 8B, autonomous vehicle 104 is shown to be positioned within moving restricted zone 28 surrounding first responder 26. As a result, at least one sensor node will include a changed accessibility status. More specifically, as autonomous vehicle 104 is located within moving restricted zone 28, the accessibility status for at least one sensor node 102 continuously detected by computing device 106 of autonomous vehicle 104 will change. In the example, the accessibility status of sensor nodes 102I, 102J, positioned adjacent to and continuously detected by autonomous vehicle 104 as it travels on roadway 18, are altered, adjusted, and/or changed from the open accessibility status to the closed accessibility status. In response to the determined change in accessibility status of sensor nodes 102I, 102J, computing device 106 of autonomous vehicle 104 can generate the modified travel pattern (MTP) instantaneously. In the non-limiting, and because of the determined change in the accessibility status of sensor nodes 102I, 102J, computing device 106 can generate the modified travel pattern (MTP) for autonomous vehicle 104 that moves autonomous vehicle from the third lane (L3) to the fourth lane (L4), and out of the way of first responder 26 (see, FIG. 8C).

Figure 9:
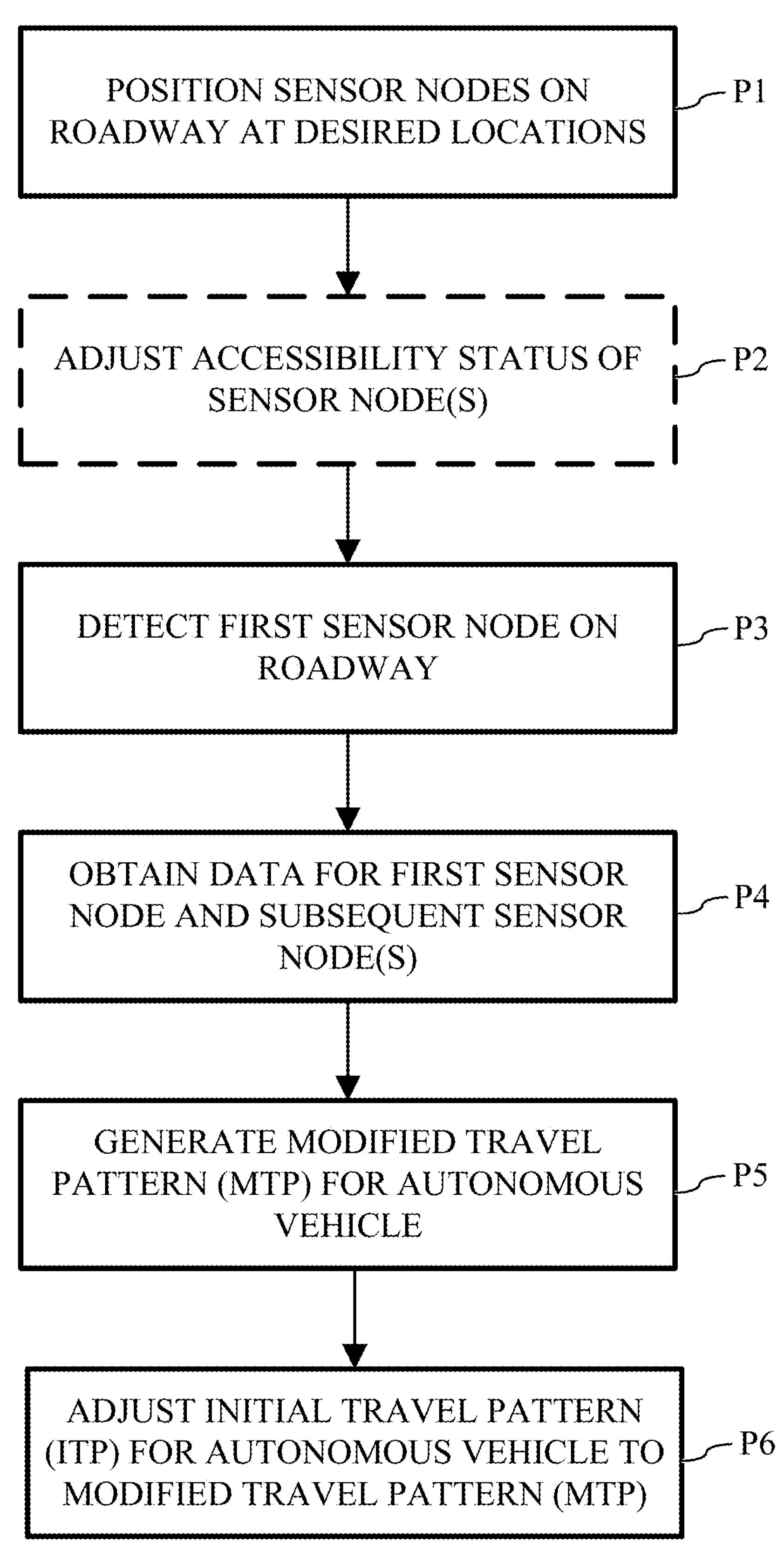
FIG. 9 shows a flowchart illustrating a process for adjusting travel patterns for autonomous vehicle, according to an example.

FIG. 9 shows example processes for adjusting travel patterns for an autonomous vehicle. Specifically, FIG. 9 shows a flowchart depicting one example process for adjusting travel patterns for an autonomous vehicle on a roadway. In some cases, the processes can be performed using autonomous vehicle 104, as discussed above with respect to FIGS. 2A-8C, and computing system including computing device 106 (and central computing device 112) shown and discussed herein with respect to FIG. 10.

In process P1 a plurality of sensor nodes is positioned on a roadway. More specifically, a plurality of sensor nodes is position on a roadway at a desired location and are separated from one another at a predetermined distance. In a non-limiting example where each of the plurality of sensor nodes are positioned on construction markers (e.g., construction barrels, pylons), the construction markers, including the sensor nodes are positioned on the roadway, in desired locations, and at a predetermined distance from one another. Additionally in the example, the construction markers including the sensor nodes are positioned on the roadway in a predetermined configuration to outline, define, and/or block-off a restricted area of the roadway. In another non-limiting example, sensor nodes are positioned directly on and/or directly embedded within the roadway. In this example, each sensor node is positioned in a desired location of the roadway (e.g., to form a grid), and are separated from one another at a predetermined distance.

In process P2, shown in phantom as optional, an accessibility status of each sensor node is adjusted. More specifically, and in the example where sensor nodes are embedded directly into the roadway, the accessibility status for at least one sensor node of the plurality sensor nodes is operably adjusted. The accessibility status for each sensor node is one of an open status or a closed/restricted status. The accessibility status of each sensor node outlines, defines, and/or blocks-off a restricted area of the roadway.

In process P3 a first sensor node of the plurality of sensor nodes is detected. More specifically, a first sensor node positioned adjacent and/or closest to the autonomous vehicle is detected by the computing device of the autonomous vehicle. In a non-limiting example, first sensor node of the plurality of sensor nodes is detected using a plurality of sensors included on the autonomous vehicle and operably coupled and/or communicative connected to the computing device of the autonomous vehicle.

In process P4, data is obtained from the plurality of sensors. More specifically, the computing device of the autonomous vehicle obtains, collects, and/or receives data from the first sensor node and each subsequent sensor node of the plurality of sensor nodes positioned adjacent to and/or downstream from the first sensor node. The data obtained by the computing device includes, but is not limited to, sensor node information (e.g., node ID), positional data for each sensor node, and/or historical position data for each sensor node. In the non-limiting example where the sensor nodes are embedded within the roadway, the data obtained by the computing device of the autonomous vehicle can also include the accessibility status for each sensor node of the plurality of sensor nodes.

In process P5, a modified travel pattern (MTP) for the autonomous vehicle is generated. More specifically, the computing device can generate, create, and/or establish a modified travel pattern (MTP) for the autonomous vehicle based on the data obtained by the plurality of sensor nodes. As discussed herein, the obtained data can include, positional data, historical position data, and/or accessibility statuses for each sensor node of the plurality of sensor nodes. Generating the modified travel pattern (MTP) can include framing the modified travel pattern (MTP) to define outer boundaries of the modified travel pattern (MTP), and/or identifying a restricted area of the roadway in which the autonomous vehicle cannot travel within and/or must avoid.

Additionally, generating the modified travel pattern (MTP) can include comparing obtained data. For example, generating the modified travel pattern (MTP) can include continuously determining the positional data for each sensor node of the plurality of sensor nodes on the roadway, and subsequently comparing the determined positional data for each sensor node of the plurality of sensor nodes with the historical position data for each sensor node of the plurality of sensor nodes. The generated modified travel pattern (MTP) can be maintained and/or unaltered in response to determining the positional data for each sensor node of the plurality of sensor nodes does not deviate from the historical position data for each sensor node of the plurality of sensor nodes beyond a sensor node threshold. In non-limiting examples, the sensor node threshold can include, but is not limited to, a predefined maximum distance of deviation between the positional data for each sensor of the plurality of sensor nodes and the historical position data specific to each sensor node of the plurality of sensor nodes. Additionally, or alternatively, the sensor node threshold can include, but is not limited to, a predefined number of times positional data differs from historical position data (e.g., moving sensor node back-and-forth), and/or a predefined duration of time in which positional data differs from historical position data.

Additionally, the restricted area or zone defined by the plurality of sensor nodes can be moving and/or dynamic. As such, the modified travel pattern (MTP) can be dynamically adjusted and/or generated. In an example where the restricted zone on the roadway is moving, generating the modified travel pattern (MTP) can include continuously detecting the accessibility status for each sensor node of the plurality of sensor nodes on the roadway, and determining if the accessibility status for at least one sensor node of the plurality of sensor nodes has changed. In response to determining the accessibility status for the at least one sensor node has changed, the modified travel pattern (MTP) is generated.

In process P6, the travel pattern for the autonomous vehicle is adjusted. More specifically, an initial travel pattern (ITP) for the autonomous vehicle on the roadway is adjusted to the generated, modified travel pattern (MTP) to avoid and/or move around the restricted zone defined by the plurality of sensor nodes. In a non-limiting example, adjusting the initial travel pattern (ITP) to the modified travel pattern (MTP) can include traversing the autonomous vehicle on the roadway, along the modified travel pattern, adjacent the plurality of sensor nodes.

Figure 10:
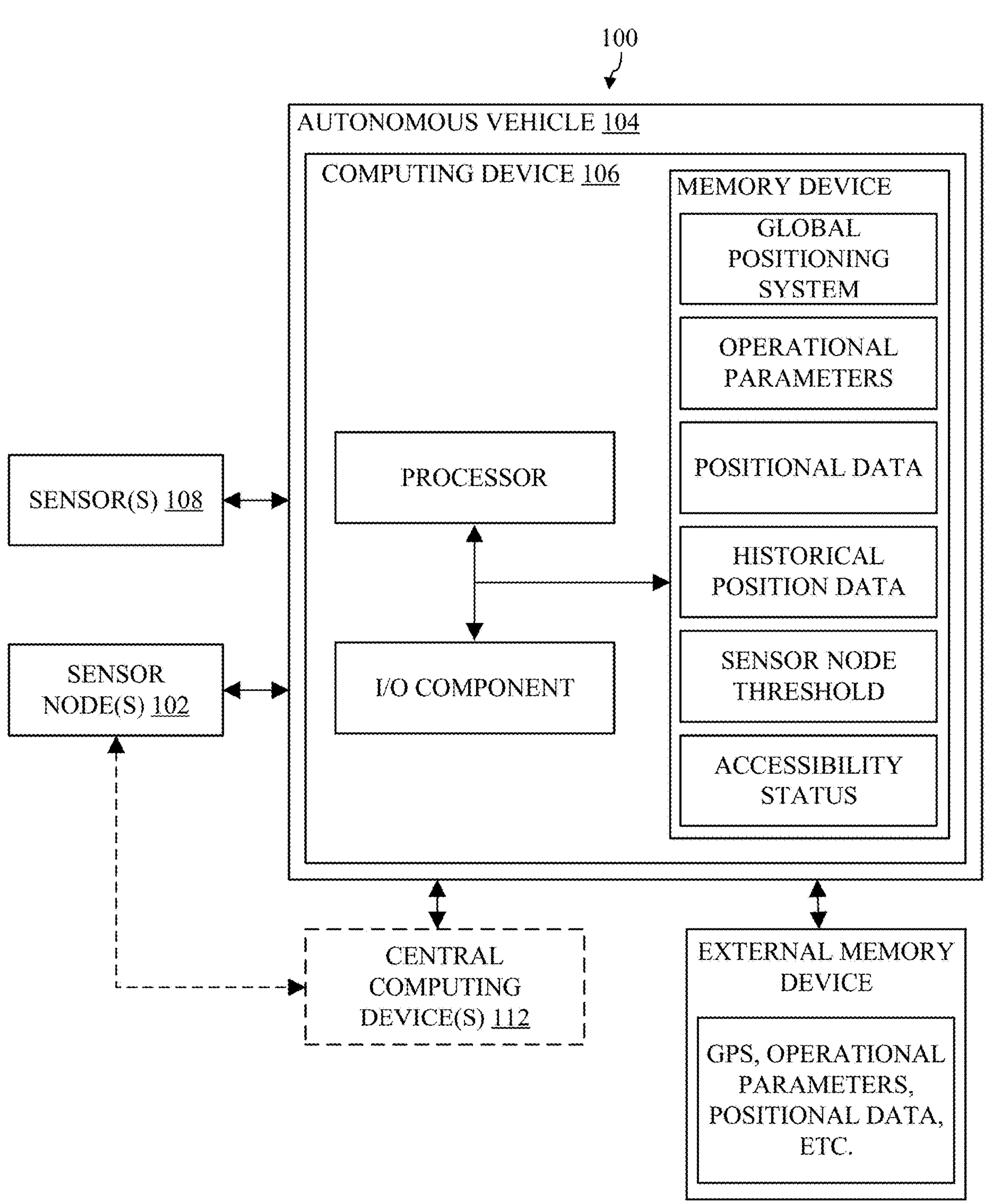
FIG. 10 shows a schematic view of a computing system including a computing device(s) configured to adjust travel patterns for autonomous vehicles, according to an example.

FIG. 10 depicts a schematic view of a computing environment or system (hereafter, "computing system"), and the various components included within computing system. In the non-limiting example shown in FIG. 10, computing system is included within autonomous vehicle 104 and includes at least one computing device 106 that is configured to adjust travel patterns for autonomous vehicle 104 (see e.g., FIGS. 2A-8C) by performing the processes P1-P6 discussed herein with respect to FIG. 9. It is understood that similarly numbered and/or named components can function in a substantially similar fashion. Redundant explanation of these components has been omitted for clarity.

Computing device 106 includes a processor, and a memory device. The processor is coupled to the memory device via a system bus. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device includes one or more devices that enable information, such as executable instructions or other data (e.g., GPS, operational parameters, positional data), to be stored and retrieved. Moreover, the memory device includes one or more computer readable media, such as, without limitation, dynamic random access memory (DRAM), static random access memory (SRAM), a solid state disk, or a hard disk. In the example embodiment, the memory device stores, without limitation, application source code, application object code, configuration data, additional input events, application states, assertion statements, validation results, or any other type of data. For example, operational modules, electronic information, and/or data relating to global positioning system (GPS), operational parameters for autonomous vehicle 104, positional data, historical position data, and accessibility statuses for sensor nodes 102 are stored within the memory device. The operational modules, information, and/or data can include the required information and/or can allow computing system, and specifically computing device 106, to perform the processes discussed herein for adjusting travel patterns for autonomous vehicle 104.

In the example embodiment, processor may be programmed by encoding an operation using one or more executable instructions and providing the executable instructions in the memory device. In the example embodiment, the processor is programmed to select a plurality of measurements that are received from data acquisition devices (e.g., sensor nodes 102, sensors 108).

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Computing system, and specifically computing device 106 of computing system, can also be in communication with external memory device. External memory device is configured to store various modules, data and/or electronic information relating to various other aspects of computing system, similar to memory device of computing device(s) 106. Additionally, external memory device is configured to share (e.g., send and receive) data and/or electronic information with computing device(s) 106 of computing system. In the non-limiting example shown in FIG. 10, external memory device can include any or all of the operational modules and/or data shown to be stored in memory device (e.g., GPS, operational parameters, etc.). In a non-limiting example, external memory device is a cloud-based storage component or system.

Additionally, computing system, and specifically computing device 106 of computing system, can be in communication with central computing device 112 (shown in phantom). As discussed herein, central computing device 112 can operably adjust the accessibility status of each of the plurality of sensor nodes 102, where the plurality of sensor nodes 102 are embedded within a roadway (e.g., roadway 18). Central computing device is configured to share (e.g., send and receive) data and/or electronic information with computing device(s) 106 of computing system, including data relating to each sensor node 102.

Computing system can include, for example, at least one input/output (I/O) component(s) (including a keyboard, touchscreen, or monitor display), and a communications pathway. I/O component can comprise one or more human I/O devices, which enables user (e.g., display vehicle driver/operator) to interact with computing device(s) 106 to adjust travel patterns for autonomous vehicle 104, as discussed herein. Computing device(s) 106 can also be implemented in a distributed manner such that different components reside in different physical locations.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance can or cannot occur, and that the description includes instances where the event occurs and instances where it does not.

Approximating language, as used herein throughout the specification and claims, is applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language can correspond to the precision of an instrument for measuring the value. Here and throughout the specification and claims, range limitations are combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, can indicate +/−10% of the stated value(s).

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system comprising:

a plurality of sensor nodes positioned on a roadway, each sensor node positioned a predetermined distance from and operably coupled to at least one distinct sensor node of the plurality of sensor nodes; and at least one autonomous vehicle computing device in electronic communication with the plurality of sensor nodes, the at least one autonomous vehicle computing device configured to adjust travel patterns for an autonomous vehicle on the roadway by performing processes including:

detecting a first sensor node of the plurality of sensor nodes;

obtaining positional data for the first sensor node and each subsequent sensor node of the plurality of sensor nodes positioned at least one of adjacent to or downstream from the first sensor node;

generating a modified travel pattern for the autonomous vehicle based on at least one of:

the positional data for each sensor node of the plurality of sensor nodes on the roadway, or an accessibility status for each sensor node of the plurality of sensor nodes on the roadway;

adjusting an initial travel pattern of the autonomous vehicle on the roadway to the modified travel pattern; and controlling the autonomous vehicle to travel along the modified travel pattern, wherein the at least one autonomous vehicle computing device is further configured to generate the modified travel pattern by:

determining the positional data for each sensor node of the plurality of sensor nodes on the roadway;

comparing the determined positional data for each sensor node of the plurality of sensor nodes with historical position data for each sensor node of the plurality of sensor nodes, the historical position data specific to each sensor node of the plurality of sensor nodes; and in response to the determined positional data for each sensor node of the plurality of sensor nodes not deviating from the historical position data for each sensor node of the plurality of sensor nodes beyond a sensor node threshold, maintaining the modified travel pattern for the autonomous vehicle based on the positional data and the historical position data.

2. The system of claim 1, wherein each sensor node of the plurality of sensor nodes are positioned on a roadway construction marker or directly on the roadway.

3. The system of claim 1, wherein the sensor node threshold includes a predefined maximum distance of deviation between the positional data for each sensor of the plurality of sensor nodes and the historical position data specific to each sensor node of the plurality of sensor nodes.

4. The system of claim 1, wherein the at least one autonomous vehicle computing device is configured to generate the modified travel pattern by performing processes including:

continuously detecting the accessibility status for each sensor node of the plurality of sensor nodes on the roadway;

determining if the accessibility status for at least one sensor node of the plurality of sensor nodes has changed; and generating the modified travel pattern for the autonomous vehicle in response to determining the accessibility status for the at least one sensor node has changed.

5. The system of claim 1, wherein the at least one autonomous vehicle computing device is configured to generate the modified travel pattern by performing processes including one of:

framing the modified travel pattern to define outer boundaries of the modified travel pattern, or identifying a restricted area of the roadway in which the autonomous vehicle cannot travel within.

6. The system of claim 1, wherein the at least one autonomous vehicle computing device is configured to adjust the initial travel pattern of the autonomous vehicle on the roadway to the modified travel pattern by performing processes including:

traversing the autonomous vehicle on the roadway, along the modified travel pattern, adjacent the plurality of sensor nodes.

7. The system of claim 1, further comprising:

at least one central computing device in electronic communication with each of the plurality of sensor nodes, the at least one central computing device distinct from the at least one autonomous vehicle computing device and configured to:

operably adjust the accessibility status of each sensor node of the plurality of sensor nodes, the accessibility status including:

an open status, or a restricted status.

8. A computer program product stored on a non-transitory computer-readable storage medium, that, when executed by a computing system, adjusts travel patterns for an autonomous vehicle on a roadway, the computer program product comprising program code for:

detecting a first sensor node of a plurality of sensor nodes, the plurality of sensor nodes positioned on the roadway;

obtaining positional data for the first sensor node and each subsequent sensor node of the plurality of sensor nodes positioned at least one of adjacent to or downstream from the first sensor node;

generating a modified travel pattern for the autonomous vehicle based on at least one of:

the positional data for each sensor node of the plurality of sensor nodes on the roadway, or an accessibility status for each sensor node of the plurality of sensor nodes on the roadway, the accessibility status including:

an open status, or a restricted status;

adjusting an initial travel pattern of the autonomous vehicle on the roadway to the modified travel pattern; and controlling the autonomous vehicle to travel along the modified travel pattern, wherein generating the modified travel pattern for the autonomous vehicle further includes:

determining the positional data for each sensor node of the plurality of sensor nodes on the roadway;

comparing the determined positional data for each sensor node of the plurality of sensor nodes with historical position data for each sensor node of the plurality of sensor nodes, the historical position data specific to each sensor node of the plurality of sensor nodes; and in response to the determined positional data for each sensor node of the plurality of sensor nodes not deviating from the historical position data for each sensor node of the plurality of sensor nodes beyond a sensor node threshold, maintaining the modified travel pattern for the autonomous vehicle based on the positional data and the historical position data.

9. The computer program product of claim 8, wherein the sensor node threshold includes a predefined maximum distance of deviation between the positional data for each sensor of the plurality of sensor nodes and the historical position data specific to each sensor node of the plurality of sensor nodes.

10. The computer program product of claim 8, wherein the generating of the modified travel pattern for the autonomous vehicle further includes:

continuously detecting the accessibility status for each sensor node of the plurality of sensor nodes on the roadway;

determining if the accessibility status for at least one sensor node of the plurality of sensor nodes has changed; and generating the modified travel pattern for the autonomous vehicle in response to determining the accessibility status for the at least one sensor node has changed.

11. The computer program product of claim 8, wherein the generating of the modified travel pattern for the autonomous vehicle further includes one of:

framing the modified travel pattern to define outer boundaries of the modified travel pattern, or identifying a restricted area of the roadway in which the autonomous vehicle cannot travel within.

12. The computer program product of claim 8, wherein the adjusting of the initial travel pattern of the autonomous vehicle on the roadway to the modified travel pattern further includes:

traversing the autonomous vehicle on the roadway, along the modified travel pattern, adjacent the plurality of sensor nodes.

13. A method for adjusting travel patterns for an autonomous vehicle on a roadway, the method comprising:

detecting a first sensor node of a plurality of sensor nodes, the plurality of sensor nodes positioned on the roadway;

obtaining positional data for the first sensor node and each subsequent sensor node of the plurality of sensor nodes positioned at least one of adjacent to or downstream from the first sensor node;

generating a modified travel pattern for the autonomous vehicle based on at least one of:

the positional data for each sensor node of the plurality of sensor nodes on the roadway, or an accessibility status for each sensor node of the plurality of sensor nodes on the roadway;

adjusting an initial travel pattern of the autonomous vehicle on the roadway to the modified travel pattern; and controlling the autonomous vehicle to travel along the modified travel pattern, wherein generating the modified travel pattern for the autonomous vehicle further comprises:

determining the positional data for each sensor node of the plurality of sensor nodes on the roadway;

comparing the determined positional data for each sensor node of the plurality of sensor nodes with historical position data for each sensor node of the plurality of sensor nodes, the historical position data specific to each sensor node of the plurality of sensor nodes; and in response to the determined positional data for each sensor node of the plurality of sensor nodes not deviating from the historical position data for each sensor node of the plurality of sensor nodes beyond a sensor node threshold, maintaining the modified travel pattern for the autonomous vehicle based on the positional data and the historical position data.

14. The method of claim 13, wherein the generating of the modified travel pattern for the autonomous vehicle further includes:

continuously detecting the accessibility status for each sensor node of the plurality of sensor nodes on the roadway;

determining if the accessibility status for at least one sensor node of the plurality of sensor nodes has changed; and generating the modified travel pattern for the autonomous vehicle in response to determining the accessibility status for the at least one sensor node has changed.

15. The method of claim 13, wherein the generating of the modified travel pattern for the autonomous vehicle further includes:

framing the modified travel pattern to define outer boundaries of the modified travel pattern, or identifying a restricted area of the roadway in which the autonomous vehicle cannot travel within.

16. The method of claim 13, further comprising:

operably adjusting the accessibility status of each sensor node of the plurality of sensor nodes, the accessibility status including:

an open status, or a restricted status.

17. The method of claim 13, wherein the adjusting of the initial travel pattern of the autonomous vehicle on the roadway to the modified travel pattern further includes:

traversing the autonomous vehicle on the roadway, along the modified travel pattern, adjacent the plurality of sensor nodes.

* * * * *